(12) United States Patent
Tsukagoshi

(10) Patent No.: US 11,128,901 B2
(45) Date of Patent: *Sep. 21, 2021

(54) TRANSMISSION APPARATUS, TRANSMISSION METHOD, RECEPTION APPARATUS, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/270,879

(22) Filed: Feb. 8, 2019

(65) Prior Publication Data

US 2019/0174153 A1 Jun. 6, 2019

Related U.S. Application Data

(63) Continuation of application No. 15/729,954, filed on Oct. 11, 2017, now Pat. No. 10,250,924, which is a
(Continued)

(30) Foreign Application Priority Data

Aug. 27, 2013 (JP) ................. 2013-176158

(51) Int. Cl.
*H04N 21/2362* (2011.01)
*H04N 21/235* (2011.01)
(Continued)

(52) U.S. Cl.
CPC ......... *H04N 21/2362* (2013.01); *H04N 19/31* (2014.11); *H04N 19/70* (2014.11);
(Continued)

(58) Field of Classification Search
CPC .... H04N 21/2362; H04N 19/31; H04N 19/70; H04N 21/2343; H04N 21/23605;
(Continued)

(56) References Cited

U.S. PATENT DOCUMENTS 9,538,211 B2 * 1/2017 Tsukagoshi ............ H04N 19/70
9,819,976 B2 * 11/2017 Tsukagoshi ............ H04N 19/70
(Continued)

FOREIGN PATENT DOCUMENTS

CN 1751503 A 3/2006
JP 11-112569 A 4/1999
(Continued)

OTHER PUBLICATIONS

Office Action dated Nov. 17, 2015 in Japanese Application No. 2015-153553.
(Continued)

*Primary Examiner* — Nnenna N Ekpo
(74) *Attorney, Agent, or Firm* — Oblon, McClelland, Maier & Neustadt, L.L.P.

(57) ABSTRACT

To enable satisfactory decoding processing corresponding to a decoding capability on a reception side.

Image data of pictures constituting moving image data are sorted into multiple hierarchies, image data of pictures of each of the sorted hierarchies are encoded, and video data including the encoded image data of the pictures of each of the hierarchies is generated. A container of a predetermined format including the video data is transmitted. The multiple hierarchies are divided into a predetermined number of hierarchy groups, the predetermined number being two or more, and identification information for identifying a hierarchy group to which encoded image data of each picture included in the video data belongs is inserted into a packet as a container of the video data.

18 Claims, 32 Drawing Sheets

Related U.S. Application Data continuation of application No. 15/369,324, filed on Dec. 5, 2016, now Pat. No. 9,819,976, which is a continuation of application No. 14/898,971, filed as application No. PCT/JP2014/071082 on Aug. 8, 2014, now Pat. No. 9,538,211.

(51) Int. Cl.

| | | |
|---|---|---|
| *H04N 21/236* | (2011.01) | |
| *H04N 19/70* | (2014.01) | |
| *H04N 19/31* | (2014.01) | |
| *H04N 21/845* | (2011.01) | |
| *H04N 21/854* | (2011.01) | |
| *H04N 21/2343* | (2011.01) | |
| *H04N 21/434* | (2011.01) | |
| *H04N 21/44* | (2011.01) | |

(52) U.S. Cl.
CPC ... *H04N 21/2343* (2013.01); *H04N 21/23605* (2013.01); *H04N 21/4343* (2013.01); *H04N 21/44004* (2013.01); *H04N 21/8451* (2013.01); *H04N 21/85406* (2013.01)

(58) Field of Classification Search
CPC ......... H04N 21/4343; H04N 21/44004; H04N 21/8451; H04N 21/85406
See application file for complete search history.

(56) References Cited

U.S. PATENT DOCUMENTS

| | | | | |
|---|---|---|---|---|
| 10,250,924 | B2* | 4/2019 | Tsukagoshi | H04N 19/70 |
| 2006/0117379 | A1* | 6/2006 | Bennett | H04L 29/06027 726/3 |
| 2007/0091881 | A1* | 4/2007 | Kallio | H04N 21/235 370/389 |
| 2009/0279614 | A1* | 11/2009 | Kim | H04N 19/31 375/240.26 |
| 2012/0044999 | A1* | 2/2012 | Kim | H04N 19/70 375/240.25 |
| 2013/0034170 | A1 | 2/2013 | Chen et al. | |
| 2013/0279576 | A1 | 10/2013 | Chen et al. | |
| 2014/0192153 | A1 | 7/2014 | Wang et al. | |

FOREIGN PATENT DOCUMENTS

| | | |
|---|---|---|
| JP | 2002-010251 A | 1/2002 |
| JP | 2003-244694 A | 8/2003 |
| JP | 2006-515132 A | 5/2006 |
| JP | 2008-523689 A | 7/2008 |
| JP | 2009-502055 A | 1/2009 |
| JP | 2009502055 A | 1/2009 |
| JP | 2009-267537 A | 11/2009 |
| JP | 2013165503 A | 8/2013 |
| WO | 03/075524 A1 | 9/2003 |
| WO | 2005/011285 A1 | 2/2005 |
| WO | 2010/032636 A1 | 3/2010 |
| WO | 2012/023281 A1 | 2/2012 |
| WO | 2012/096806 A1 | 7/2012 |
| WO | 2012/096981 A1 | 7/2012 |
| WO | WO 2013/116352 A1 | 8/2013 |

OTHER PUBLICATIONS

Office Action dated Nov. 17, 2015 in Japanese Application No. 2015-153694.
International Search Report dated Sep. 16, 2014 for PCT/JP2014/071082 filed Aug. 8, 2014.
Sullivan, et al., "Overview of the High Efficiency Video Coding (HEVC) Standard," IEEE Transactions on Circuits and Systems for Video Technology, vol. 22, No. 12, Dec. 2012, pp. 1649-1668.
"Information technology—Generic coding of moving pictures and associated audio information: Systems," Amendment 3: Transport of HEVC video over MPEG-2 systems, May 24, 2012, p. 5, URL, http://itscj.ipsj.or.jp/sc29/open/29view/29n12806t.doc.
Sato, et. al., "Consideration of buffer management issues HEVC scalability," Joint Collaborative Team on Video Coding (JCT-VC) of ITU-TSG 16 WP 3 and ISO/IEC JTC 1/SC 29/WG 11 14th Meeting: Vienna, Austria, AT, Jul. 29 to Aug. 2, 2013, pp. 1-6, URL, http://phenix.it-sudparis.eu/jct/doc_end_user/documents/14_Vienna/wg11/JCTVC-N0049-v2.zip.
Sjoberg, et al., "High-Level Syntax for Bitstream Extraction," Joint Collaborative Team on Video Coding of ITU-T SG 16 WP 3 and ISO/IEC JTC1/SC29/WG11, Nov. 2011.
Office Action dated Apr. 7, 2015 for Japanese Application No. 2013-176158 filed Aug. 8, 2013 (with English translation).
Extended European Search Report dated Dec. 23, 2016 in European Application No. 14840458.5.
Munsi Haque, et al., "On HEVC Descriptors for Temporal Substreams with Multiple PIDs in a MPEG-2 Transport Stream" Sony Electronics, Inc. and Sony Corp. ISO/IEC JTC1/SC29WG11, XP030054520, Jul. 16, 2012, 6 Pages.
Karsten Grüneberg, et al., "On Transport of HEVC Over MPEG-2 Systems" Fraunhofer HHI, ISO/IEC JTC1/SC29/WG11 MPEG100/M24841, XP030053184, Apr. 25, 2012, pp. 1-5.
Thomas Schierl, et al., "System Layer Integration of HEYC" IEEE TCSVT #6206, XP050687116, Oct. 31, 2012, pp. 1-13.
Combined Chinese Office Action and Search Report dated Jun. 20, 2018 in corresponding Patent Application No. 201480035205.1 (with English translation), 16 pages.
Office Action dated Jul. 17, 2018 in Japanese Application No. 2017-175863 (with English translation), 8 pages.
Office Action issued in corresponding Japanese Application No. 15/729,954 dated Sep. 25, 2018 (with English translation), 8 pages.
Japanese Office Action dated Aug. 6, 2019 in Patent Application No. 2018-233539.
Extended European Search Report dated Jun. 27. 2019 in Patent Application No. 19175842.4, 13 pages.

* cited by examiner

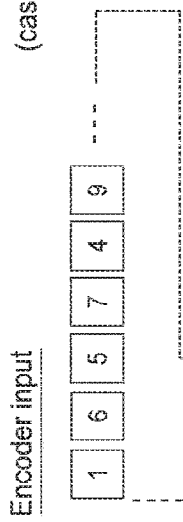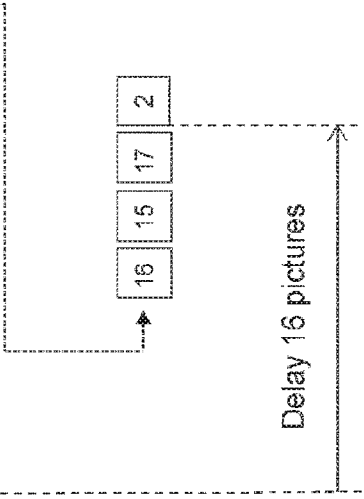
FIG.6

```
HEVC_descriptor() {
    descriptor_tag                              8    uimsbf
    descriptor_length                           8    uimsbf
    profile_space                               2    uimsbf
    tier_flag                                   1    bslbf
    profile_idc                                 5    uimsbf
    reserved_zero_16bits                       16    bslbf
    level_idc                                   8    uimsbf
    profile_compatibility_indication           32    bslbf
    temporal_layer_subset_flag                  1    bslbf
    HEVC_still_present_flag                     1    bslbf
    HEVC_24hr_picture_present_flag              1    bslbf
    frame_packing_arrangement_SEI_present_flag  1    bslbf
    level_constrained_flag                      1    bslbf
    scalability_id                              3    bslbf
    if ( temporal_layer_subset_flag == '1') {   3    bslbf
        temporal_id_min                         5    uimsbf
        reserved                                3    bslbf
        temporal_id_max                         5    uimsbf
        reserved                                5    bslbf
    }
}
```

FIG. 8

Semantics

| level_constrained_flag (1bit) | | Representing that general_level_idc may change for each encoded picture |
|---|---|---|
| | 1 | Representing possibility of change |
| | 0 | Representing no change |
| scalability_id (3bits) | | ID indicating scalability given to each stream when multiple video streams supply one scalable service |
| | 0 | Base stream |
| | 1~7 | Id increasing according to degree of scalability from Base stream |

FIG.9 scalability_extension_descriptor

| Syntax | No. of Bits | Format |
|---|---|---|
| scalability_extension_descriptor( ) { | | |
|   scalability_extension_descriptor_tag | 8 | uimsibf |
|   scalability_extension_descriptor_length | 8 | uimsibf |
|   extension_stream_existing_flag | 1 | bslbf |
|   extension_type | 3 | bslbf |
|   number_of_streams | 4 | bslbf |
|   scalability_id | 3 | bslbf |
|   reserved | 2 | 0x3 |
|   number_of_layers | 3 | bslbf |
|   for ( k = 0 ; k < number_of_layers; k++) | | |
|     sublayer_level_idc[k] | 8 | uimsibf |
| } | | |

FIG. 10 scalability_extension_descriptor semantics extension_stream_existing_flag (1bit) Flag indicating presence of extension service by different stream
 1   Extended stream is present
 0   Extended stream is absent
extension_type (3bits) Representing type of extension
 001   Extension is time direction scalable
 010   Extension is spatial direction scalable
 011   Extension is bit rate scalable
 ohters   reserved
number_of_streams (4bits) Total number of streams involving distribution service
 0000   reserved
 0001   1 stream
 : 
 1111   15 streams
scalability_id (3bits) ID indicating scalability given to each stream when multiple video streams supply one scalable service
 0   Base stream
 1~7   id increasing according to degree of scalability from Base stream
number_of_layers (3bits) Representing total number of hierarchies of the stream
 0   Prohibition
 1~7   Value of number of hierarchies
sublayer_level_idc (8bits) Representing value of level_idc at which corresponding sublayer represented by temporal_id includes layer lower than that sublayer and which is handled by decoder

FIG. 11

| Syntax | No. of Bits | Format |
|---|---|---|
| SampleDependencyTypeBox ( ) { | | |
| reserved | 2 | '0' |
| sample_depends_on | 2 | bslbf |
| sample_is_depended_on | 2 | bslbf |
| sample_has_redundancy | 2 | bslbf |
| } | | |

FIG.30

Semantics sample_depends_on takes one of the following four values:
    0: the dependency of this sample is unknown;
    1: this sample does depend on others (not an I picture);
    2: this sample does not depend on others (I picture);
    3: reserved
sample_is_depended_on takes one of the following four values:
    0: the dependency of other samples on this sample is unknown;
    1: other samples may depend on this one (not disposable);
    2: no other sample depends on this one (disposable);
    3: reserved
sample_has_redundancy takes one of the following four values:
    0: it is unknown whether there is redundant coding in this sample;
    1: there is redundant coding in this sample;
    2: there is no redundant coding in this sample;
    3: reserved

FIG.31

| Syntax | No. of Bits | Format |
|---|---|---|
| SampleScalablePriorityBox ( ) { | | |
| reserved | 2 | '0' |
| sample_depends_on | 2 | bslbf |
| base_and_priority | 2 | bslbf |
| sample_has_redundancy | 2 | bslbf |
| } | | |

FIG.32

Semantics sample_depends_on takes one of the following four values:
    0: the dependency of this sample is unknown;
    1: this sample does depend on others (not an I picture);
    2: this sample does not depend on others (I picture);
    3: reserved
base_and_priority takes one of the following four values:
    0: non-scalable sample;
    1: priority is LOW and indicates non-base sample for scalability
    2: priority is HIGH and indicates base sample for scalability
    3: reserved
sample_has_redundancy takes one of the following four values:
    0: it is unknown whether there is redundant coding in this sample;
    1: there is redundant coding in this sample;
    2: there is no redundant coding in this sample;
    3: reserved

FIG.33

TRANSMISSION APPARATUS, TRANSMISSION METHOD, RECEPTION APPARATUS, AND RECEPTION METHOD

CROSS-REFERENCE TO RELATED APPLICATIONS

This application is a continuation U.S. application Ser. No. 15/729,954, filed Oct. 11, 2017, which is a continuation of U.S. application Ser. No. 15/369,324 (now U.S. Pat. No. 9,819,976), filed Dec. 5, 2016, which is a continuation of Ser. No. 14/898,971 (now U.S. Pat. No. 9,538,211), filed Dec. 16, 2015, which is a U.S. national stage of International Application No. PCT/JP2014/071082, filed Aug. 8, 2014, which is based upon and claims the benefit of priority from Japanese Patent Application No. 2013-176158, filed Aug. 27, 2013. The entire contents of each of the above-identified documents are incorporated herein by reference.

TECHNICAL FIELD

The present technology relates to a transmission apparatus, a transmission method, a reception apparatus, and a reception method. More specifically, the present technology relates to a transmission apparatus and the like that hierarchically encode and transmit image data of each picture constituting moving image data.

BACKGROUND ART

When compressed moving images are provided over broadcasting, network services, and the like, the upper limit of a frame frequency that can be played back is restricted by a decoding capability of a receiver. Therefore, a service side is required to take the playback performance of prevalent receivers into account, and restrict the service to a low frame frequency only or simultaneously provide multiple high and low frame frequency services.

A support for high frame frequency services increases the cost of the receiver, which becomes a barrier to rapid diffusion of the service. If only low-cost receivers dedicated to low frame frequency services are widespread in early times, and the service side starts a high frame frequency service in the future, the new service is completely unwatchable without a new receiver, which becomes a barrier to diffusion of the service.

For example, a time direction scalability is proposed, in which image data of each picture constituting moving image data is subjected to hierarchical encoding in HEVC (High Efficiency Video Coding) (see Non-patent Document 1). A reception side can identify a hierarchy of each picture on the basis of a temporal ID (temporal_id) inserted into the header of a NAL (Network Abstraction Layer) unit and perform selective decoding to a hierarchy corresponding to a decoding capability.

[Non-patent Document 1] Gary J. Sullivan, Jens-Rainer Ohm, Woo-Jin Han, Thomas Wiegand, "Overview of the High Efficiency Video Coding (HEVC) Standard" IEEE TRANSACTIONS ON CIRCUITS AND SYSTEMS FOR VIDEO TECHNOLOGY, VOL. 22, NO. 12, pp. 1649-1668, DECEMBER 2012

SUMMARY OF INVENTION

Problem to be Solved by the Invention

It is an object of the present technology to enable satisfactory decoding processing corresponding to a decoding capability on a reception side.

Means For Solving the Problem

A concept of the present technology resides in a transmission apparatus including: an image encoding unit that sorts image data of pictures constituting moving image data into multiple hierarchies, encodes image data of pictures of each of the sorted hierarchies, and generates video data including the encoded image data of the pictures of each of the hierarchies; a transmission unit that transmits a container of a predetermined format including the generated video data; and an identification information insertion unit that divides the multiple hierarchies into a predetermined number of hierarchy groups, the predetermined number being two or more, and inserts identification information for identifying a hierarchy group to which encoded image data of each picture included in the video data belongs, into a packet as a container of the video data.

In the present technology, by the image encoding unit, image data of pictures constituting moving image data are encoded and video data is generated. In this case, the image data of pictures constituting moving image data are sorted into the multiple hierarchies and encoded, and the video data including the encoded image data of the pictures of each of the hierarchies is generated.

By the transmission unit, container of a predetermined format including the video data described above is transmitted. For example, the container may be a transport stream (MPEG-2 TS) adopted in the standard of digital broadcasting. Further, for example, the container may be an MP4 used in distribution over the Internet and the like, or a container of any other format.

By the identification information insertion unit, the multiple hierarchies are divided into a predetermined number of hierarchy groups, the predetermined number being two or more, and identification information for identifying a hierarchy group to which encoded image data of each picture included in the video data belongs is inserted into a packet as a container of the video data. For example, the identification information may be degree-of-priority information that is set to be higher for a hierarchy group on a low hierarchy side.

For example, the identification information may be inserted into a header of a PES packet including the encoded image data for each picture in a payload. In this case, for example, the identification information may be inserted using a field of a PES priority of the header. Further, for example, the identification information may be inserted into an adaptation field of a TS packet including the adaptation field. In this case, for example, the identification information may be inserted using a field of an ES priority indicator of the adaptation field. Further, for example, the identification information may be inserted into a box of a header related to a track of an appropriate picture.

As described above, in the present technology, the identification information for identifying a hierarchy group to which encoded image data of each picture included in the video data belongs is inserted into a packet as a container of the video data. Therefore, on the reception side, it is easily possible to selectively decode encoded image data of a picture of a hierarchy equal to or lower than a predetermined hierarchy corresponding to a decoding capability by using the identification information.

It should be noted that in the present technology, for example, the image encoding unit may generate a single video stream including the encoded image data of the pictures of each of the hierarchies or may divide the multiple hierarchies into a predetermined number of hierarchy groups, the predetermined number being two or more, and generate a predetermined number of video streams each including the encoded image data of the pictures of each hierarchy group, and may further include a configuration information insertion unit that inserts configuration information of the video streams included in the container into a layer of the container. In this case, for example, on the reception side, it is possible to easily grasp the configuration of the video streams on the basis of the configuration information of the video streams included in the container.

Further, another concept of the present technology resides in a reception apparatus including: an reception unit that receives a container of a predetermined format including video data including encoded image data of pictures of each of hierarchies, the encoded image data being obtained by sorting image data of pictures constituting moving image data into multiple hierarchies and encoding the image data; and an image decoding unit that selectively takes in a buffer encoded image data of a picture of a hierarchy equal to or lower than a predetermined hierarchy corresponding to a decoding capability from the video data included in the received container, decodes the encoded image data of each picture taken in the buffer, and obtains image data of the picture of the hierarchy equal to or lower than the predetermined hierarchy.

In the present technology, by the reception unit, a container of a predetermined format is received. In the container, video data including image data of pictures of each hierarchy, which is obtained by sorting image data of pictures constituting moving image data into multiple hierarchies and encoding the image data, is included.

By the image decoding unit, the encoded image data of a picture of a hierarchy equal to or lower than a predetermined hierarchy corresponding to a decoding capability is selectively taken in the buffer from the video data included in the received container, the encoded image data of each picture taken in the buffer is decoded, and the image data of the picture of the hierarchy equal to or lower than the predetermined hierarchy is obtained.

For example, the multiple hierarchies may be divided into a predetermined number of hierarchy groups, the predetermined number being two or more, and identification information for identifying a hierarchy group to which the encoded image data of each picture included in the video data belongs may be inserted into a packet as a container of the video data, and the image decoding unit may take in the buffer the encoded image data of the picture of a predetermined hierarchy group corresponding to the decoding capability and decode the encoded image data on the basis of the identification information.

In this case, for example, the identification information may be inserted into a header of a PES packet including the encoded image data for each picture in a payload. Further, in this case, for example, the identification information may be inserted into an adaptation field of a TS packet including the adaptation field. Further, in this case, for example, the identification information may be inserted into a box of a header related to a track of an appropriate picture.

Further, for example, the multiple hierarchies may be divided into a predetermined number of hierarchy groups, the predetermined number being two or more, and the received container may include the predetermined number of video streams respectively including encoded image data of pictures of the predetermined number of hierarchy groups, and the image decoding unit may take in the buffer the encoded image data of the picture of the predetermined hierarchy group corresponding to the decoding capability and decode the encoded image data on the basis of stream identification information. In this case, for example, the image decoding unit may convert, when the encoded image data of the picture of the predetermined hierarchy group is included in multiple video streams, the encoded image data of each picture into one scream on the basis of decoding timing information and takes the stream in the buffer.

As described above, in the present technology, the encoded image data of a picture of a hierarchy equal to or lower than a predetermined hierarchy corresponding to a decoding capability is selectively taken in the buffer from the received video data and then decoded. Therefore, it is possible to perform appropriate decoding processing corresponding to the decoding capability.

It should be noted that in the present technology, for example, the image decoding unit may have a function of rewriting a decoding time stamp of the encoded image data of each picture selectively taken in the buffer and adjusting decoding intervals of low hierarchy pictures. In this case, realistic decoding processing can be performed even in a decoder having a low decoding capability.

Further, in the present technology, for example, the reception apparatus may further include a post-processing unit that matches a frame rate of the image data of each picture obtained in the image decoding unit with the display capability. In this case, the image data of the frame rate matched with a high display capability can be obtained even when the decoding capability is low.

Effect of the Invention

According to the present technology, it is possible to perform satisfactory decoding processing corresponding to a decoding capability on a reception side. It should be noted that the effects described herein are not necessarily limited but may be any effect described herein.

BRIEF DESCRIPTION OF DRAWINGS

FIG. 6 is a diagram showing an example of encoding, decoding, display order, and delay in hierarchical encoding.

FIG. 8 is a diagram showing a structural example (Syntax) of an HEVC descriptor (HEVC_descriptor).

FIG. 9 is a diagram showing details (Semantics) of main information in the structural example of the HEVC descriptor.

FIG. 10 is a diagram showing a structural example (Syntax) of a scalability extension descriptor (scalability_extension_descriptor).

FIG. 11 is a diagram showing details (Semantics) of main information in the structural example of the scalability extension descriptor.

FIG. 30 is a diagram showing a structural example of "SampleDependencyTypeBox".

FIG. 31 is a diagram showing details of main information in the structural example of "SampleDependencyTypeBox".

FIG. 32 is a diagram showing a structural example of "SampleScalablePriorityBox".

FIG. 33 is a diagram showing detans of main information in the structural example of "SampleScalablePriorityBox".

MODE(S) FOR CARRYING OUT THE INVENTION

Hereinafter, a mode for carrying out the invention (hereinafter, called "embodiment") will be described. It should be noted that the description is provided in the following order.

1. Embodiment
2. Modified Example

1. Embodiment

[Transmission and Reception System]

Figure 1:
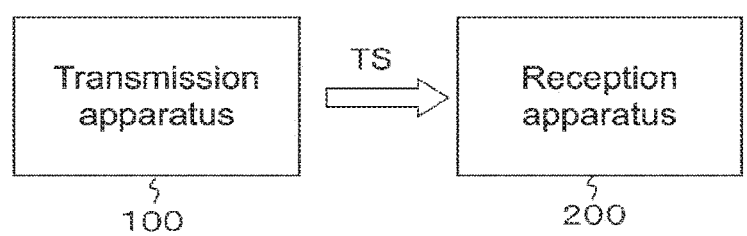
FIG. 1 is a block diagram showing a configuration example of a transmission and reception system as an embodiment.

FIG. 1 shows a configuration example of a transmission and reception system 10 as an embodiment. The transmission and reception system 10 has a configuration including a transmission apparatus 100 and a reception apparatus 200.

The transmission apparatus 100 transmits a transport stream TS as a container on a broadcast wave. In the transport stream TS, image data of pictures constituting moving image data are sorted into multiple hierarchies, and a video stream including encoded data of image data of pictures of each of the hierarchies is included. In this case, for example, encoding such as H.264/AVC and HEVC is performed, and a referenced picture is encoded so as to belong to a hierarchy of the referenced picture and/or a hierarchy lower than the hierarchy of the referenced picture.

Hierarchy identification information for identifying a hierarchy to which encoded image data belongs is added to the encoded image data of each picture of each hierarchy. In this embodiment, in a header portion of a NAL unit (nal_unit) of each picture, hierarchy identification information ("nuh_temporal_id_plus1" representing temporal_id) is arranged. By addition of the hierarchy identification information in such a manner, on the reception side, it is possible to identify a hierarchy of each picture in a layer of the NAL unit and to perform decoding processing by selectively taking out encoded image data of a hierarchy equal to or lower than a predetermined hierarchy.

In this embodiment, the multiple hierarchies are divided into a predetermined number of, i.e., two or more hierarchy groups, and identification information for identifying a hierarchy group to which encoded image data of each picture included in the video stream belongs is inserted into a layer of the video stream.

In this embodiment, the identification information is considered as degree-of-priority information that is set to be higher for a hierarchy group on the low hierarchy side, and is inserted into a header of a PES packet including encoded image data of each picture in a payload. The identification information enables the reception side to take in a buffer and process only encoded image data of a picture of a hierarchy group corresponding to a decoding capability of the reception side.

The transport stream TS includes a single video stream including encoded image data of a picture of each hierarchy, or a predetermined number of video streams each including encoded image data of a picture of each hierarchy group described above. In the transport stream TS, hierarchy information of hierarchical encoding and configuration information of a video stream are inserted. Those pieces of information enable the reception side to easily grasp a hierarchy configuration or a stream configuration and preform appropriate decoding processing.

The reception apparatus 200 receives the above-mentioned transport stream TS transmitted from the transmission apparatus 100 on a broadcast wave. The reception apparatus 200 selectively takes in a buffer encoded image data of a picture of a hierarchy lower than a predetermined hierarchy selected according to a decoding capability from a video stream included in the transport stream TS, performs decoding, acquires image data of each picture, and perform image reproduction.

For example, as described above, the transport stream TS may include a single video stream including encoded image data of pictures of the multiple hierarchies. In such a case, on the basis of the above-mentioned identification information, the encoded image data of a picture of a predetermined hierarchy group corresponding to a decoding capability is taken in the buffer and processed.

Further, for example, as described above, the transport stream TS may include a predetermined number of video streams including encoded image data of pictures of a predetermined number of, i.e., two or more hierarchy groups, which are obtained by dividing the multiple hierarchies. In such a case, the encoded image data of a picture of a predetermined hierarchy group corresponding to a decoding capability is taken in the buffer and processed on the basis of stream identification information.

Further, the reception apparatus 200 performs processing of rewriting a decoding time stamp of encoded image data of each picture selectively taken in the buffer and adjusting decoding intervals of low hierarchy pictures. This adjusting processing enables realistic decoding processing even in a decoder having a low decoding capability.

Further, the reception apparatus 200 performs post-processing of matching a frame rate of image data of each picture, which is obtained by decoding as described above, with a display capability. The post-processing enables obtaining image data of a frame rate matched with a high display capability even when the decoding capability is low, for example.

"Configuration of Transmission Apparatus"

Figure 2:
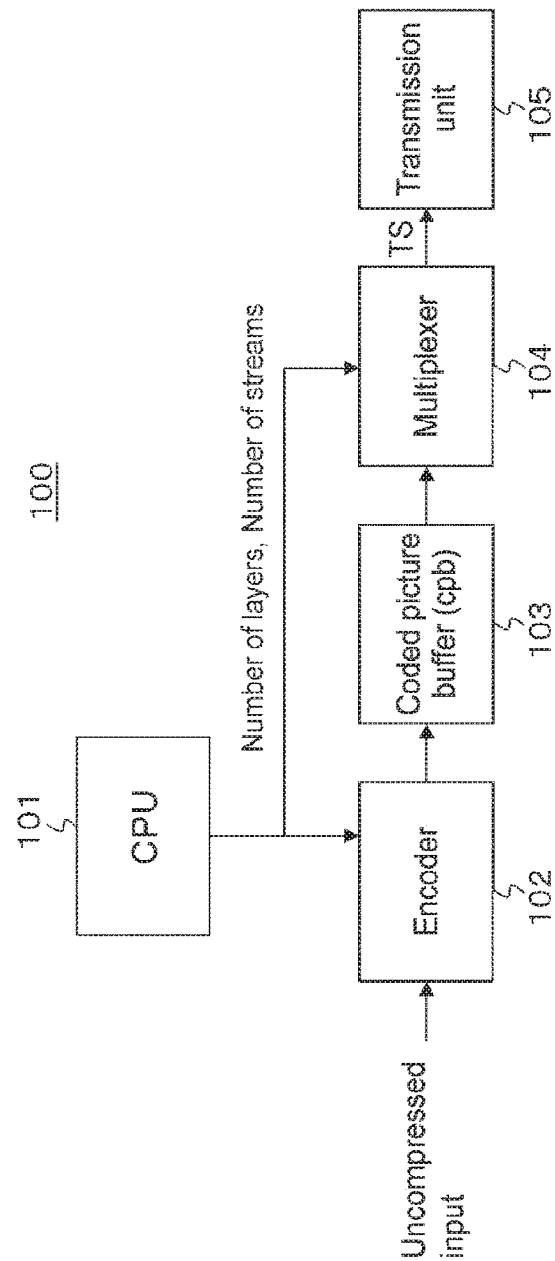
FIG. 2 is a block diagram showing a configuration example of a transmission apparatus.

FIG. 2 shows a configuration example of the transmission apparatus 100. The transmission apparatus 100 includes a CPU (Central Processing Unit) 101, an encoder 102, a coded picture buffer (cpb) 103, a multiplexer 104, and a transmission unit 105. The CPU 101 is a control unit and controls operations of respective units of the transmission apparatus 100.

The encoder 102 inputs uncompressed moving image data and performs hierarchical encoding. The encoder 102 sorts image data of pictures constituting the moving image data into multiple hierarchies. The encoder 102 then encodes the image data of pictures of each sorted hierarchy and generates a video stream having encoded image data of pictures of each hierarchy. For example, the encoder 102 performs encoding such as H.264/AVC and HEVC. At that time, the encoder 102 performs encoding such that a picture to be referenced (referenced picture) belongs to a hierarchy of the referenced picture and/or a hierarchy lower than the hierarchy of the referenced picture.

Figure 3:
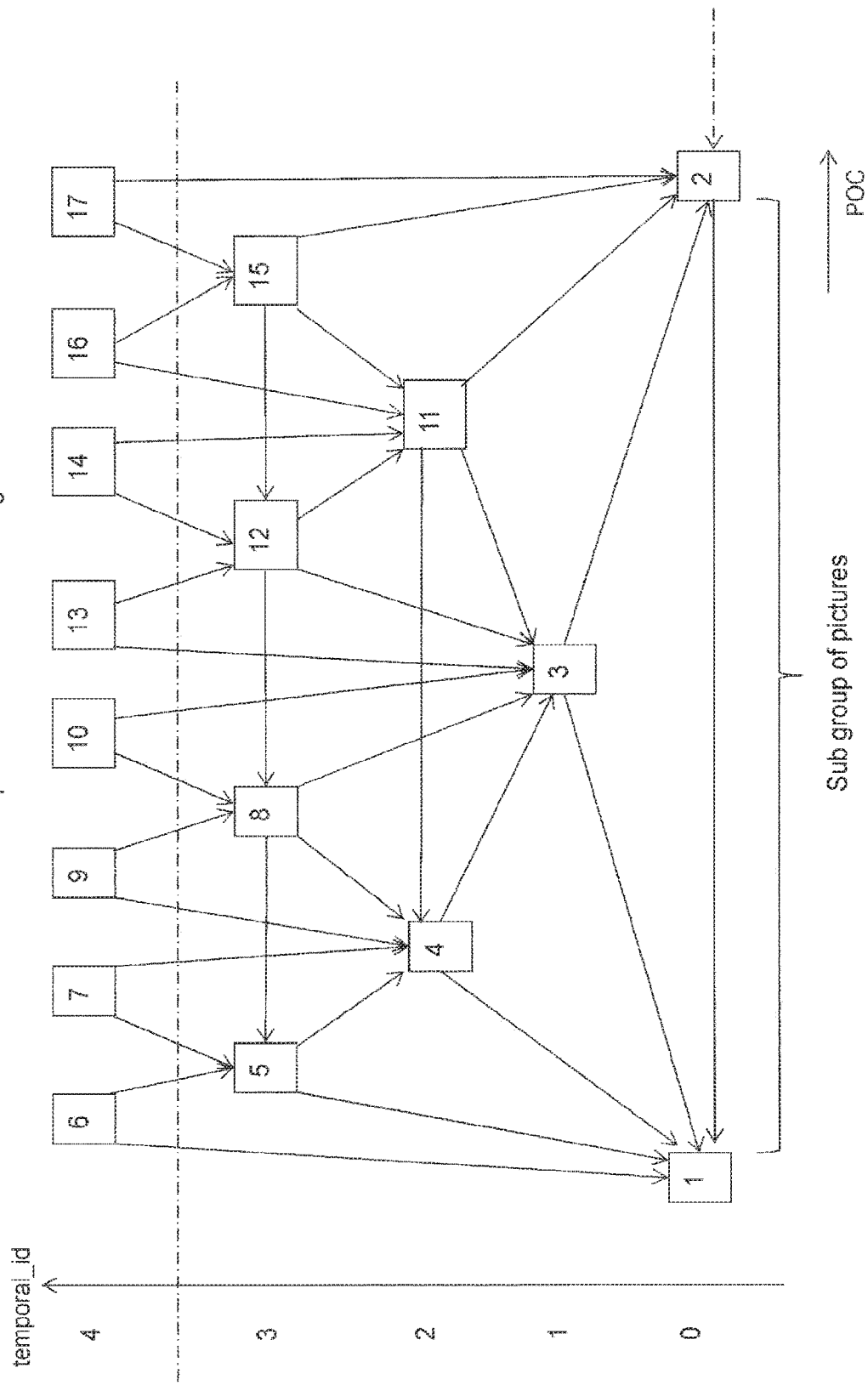
FIG. 3 is a diagram showing an example of hierarchical encoding performed in an encoder.

FIG. 3 shows an example of hierarchical encoding performed in the encoder 102. In this example, five hierarchies from 0 to 4 are provided by sorting, and image data of pictures of each hierarchy is subjected to encoding, for example, HEVC.

The vertical axis represents a hierarchy. 0 to 4 are set as temporal_id (hierarchy identification information) arranged in a header portion of a NAL unit (nal_unit) constituting the encoded image data of pictures of the hierarchies of 0 to 4, respectively. On the other hand, the horizontal axis represents a display order (POC: picture order of composition), in which the left side represents an earlier display time and the right side represents a later display time.

Figures 4, 5:
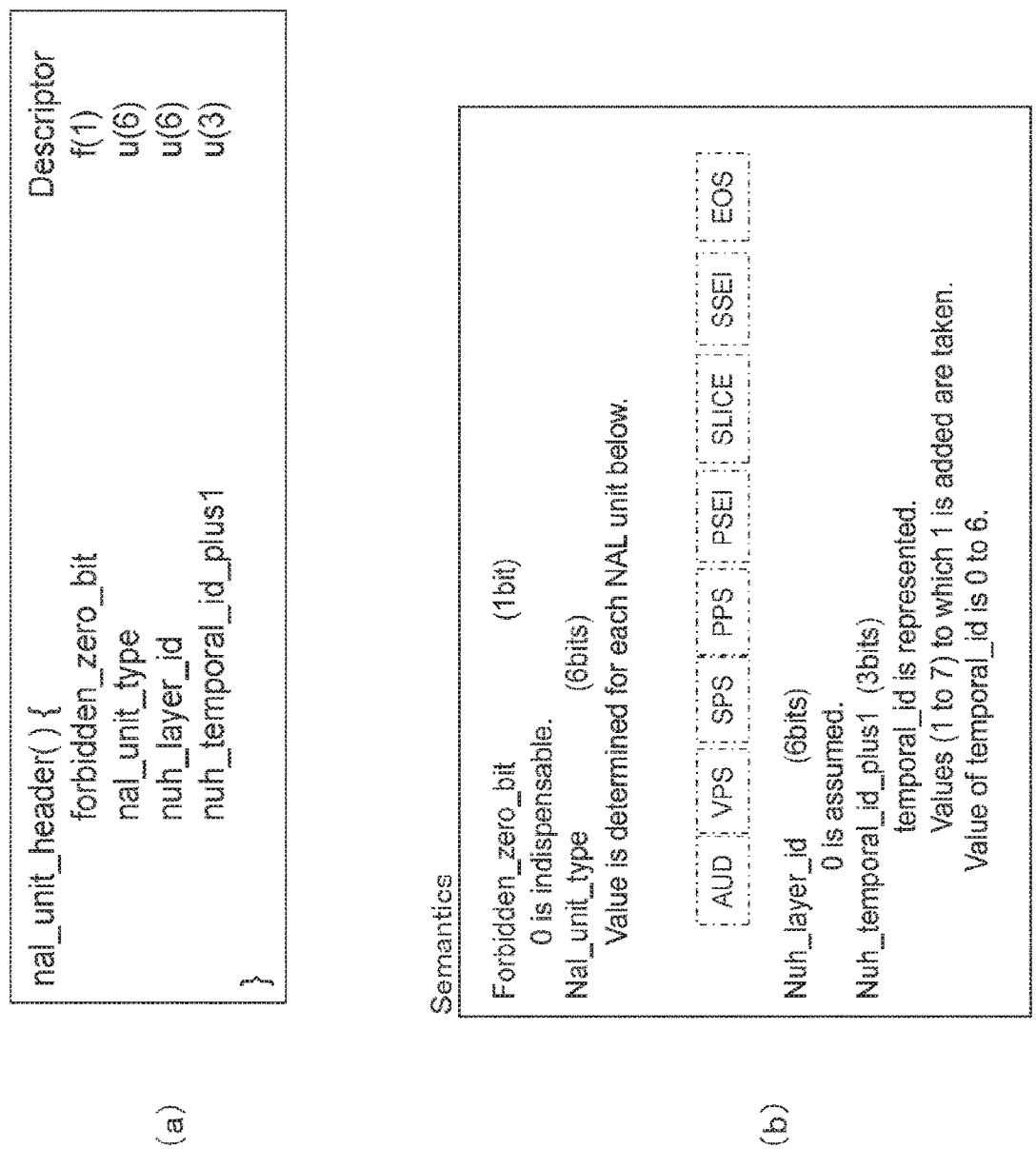
FIG. 4 is a diagram showing a structural example (Syntax) of a NAL unit header and details (Semantics) of main parameters in the structural example.
FIG. 5 is a diagram for describing a configuration of encoded image data in each picture by HEVC.

Part (a) of FIG. 4 shows a structural example (Syntax) of a NAL unit header, and part (b) of FIG. 4 shows details (Semantics) of main parameters in the structural example. 0 is indispensable for a 1-bit field of "Forbidden_zero_bit". A 6-bit field of "Nal_unit_type" represents, a NAL unit type. A 6-bit field of "Nuh_layer_id" assumes 0. A 3-bit field of "Nun_temporal_id_plus1" represents a temporal_id and takes values (1 to 7) to which 1 is added.

Referring back to FIG. 3, each rectangular frame represents a picture, and a number represents an order of encoded picture, that is, encoded order (decoded order on the reception side). 16 pictures from "1" to "17" (excluding "2") constitute a sub group of pictures, and "1" is a head picture of the sub group of pictures. "2" is a head picture of the next sub group of pictures. Alternatively, 16 pictures from "2" to "17" except for "1" constitute a sub group of pictures, and "2" is a head picture of the sub group of pictures.

The picture "1" may be a head picture of a GOP (Group Of Pictures). The encoded image data of the head picture of the GOP is constituted of NAL units of AUD, VPS, SPS, PPS, PSEI, SLICE, SSEI, and EOS as shown in FIG. 5. On the other hand, pictures other than the head picture of the GOP are each constituted of NAL units of AUD, PPS, PSEI, SLICE, SSEI, and EOS. The VPS is transmittable to a sequence (GOP) one time together with the SPS, and the PPS is transmittable in MY Picture.

Referring back to FIG. 3, solid arrows represent a reference relationship of pictures in encoding. For example, a picture "1" is an I picture that does not reference other pictures. A picture "2" is a P picture that references the picture "1" and is encoded. Further, a picture "3" is a B picture that references the pictures "1" and "3" and is encoded. Hereinafter, the other pictures similarly reference a near picture in the display order and are encoded. It should be noted that the pictures of the hierarchy 4 are not referenced by other pictures.

The encoder 102 generates a single video stream (single stream) including encoded image data of pictures of each hierarchy, or divides the multiple hierarchies into a predetermined number of, i.e., two or more hierarchy groups and generates a predetermined number of video streams (multistream) each including encoded image data of pictures of each hierarchy group. For example, in the example of the hierarchical encoding of FIG. 3, when the hierarchies are divided into two hierarchy groups such that the hierarchies 0 to 3 are set to a hierarchy group of a lower hierarchy and the hierarchy 4 is set to a hierarchy group of a higher hierarchy, the encoder 102 generates two video streams (encoded streams) each including encoded image data of pictures of each hierarchy group.

Irrespective of the number of generated video streams, as described above, the encoder 102 divides the multiple hierarchies into a predetermined number of, i.e., two or more hierarchy groups and adds identification information for identifying a hierarchy group to which encoded image data belongs to the encoded image data of pictures of each hierarchy group. In this case, for example, for the identification information, "general_level_idc" as a level specification value of a bit stream included in the SPS is used, and a hierarchy group on the high hierarchy side takes a higher value. It should be noted that "sub_layer_level_idc" can be transmitted in the SPS on a sublayer-by-sublayer basis, and thus "sub_layer_level_idc" may be used as the identification information. Those above values are supplied not only in the SPS but also in the VPS.

In this case, a value of the level specification value of each hierarchy group is set to a value corresponding to a frame rate constituted of pictures of this hierarchy group and pictures of all the hierarchy groups on the hierarchy side lower than this hierarchy group. For example, in the example of the hierarchical encoding of FIG. 3, the level specification value of the hierarchy group including the hierarchies from 0 to 3 is a value corresponding to a frame rate constituted of only the pictures of the hierarchies from 0 to 3, and the level specification value of the hierarchy group including the hierarchy 4 is a value corresponding to a frame rate constituted of the pictures of all the hierarchies from 0 to 4.

FIG. 6 shows an example of encoding, decoding, display order, and delay in the hierarchical encoding. This example corresponds to the example of the above-mentioned hierarchical encoding in FIG. 3. This example shows a case where all hierarchies (all layers) are subjected to hierarchical encoding at a full temporal resolution. Part (a) of FIG. 6 shows encoder inputs. As shown in part (b) of FIG. 6, the pictures are encoded in the encoding order with delay corresponding to 16 pictures, and an encoded stream is obtained. Further, part (b) of FIG. 6 shows decoder inputs, and the pictures are decoded in the decoding order. As shown in part (c) of FIG. 6, image data of the pictures are obtained in the display order with delay corresponding to 4 pictures.

Figure 7:
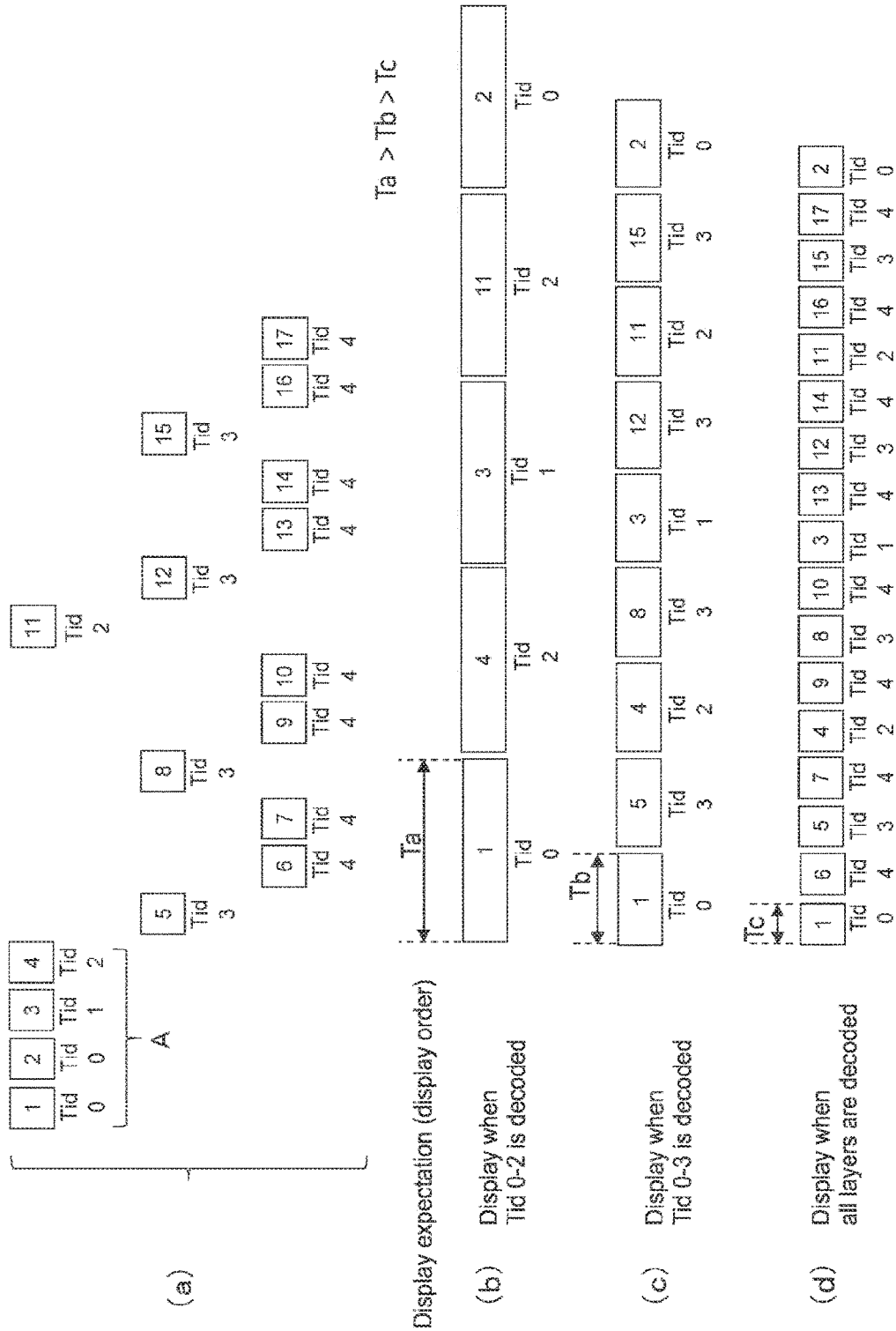
FIG. 7 is a diagram showing an encoded stream of hierarchical encoding and a display expectation (display order) in a specified hierarchy.

Part (a) of FIG. 7 shows an encoded stream, which is similar to the above-mentioned encoded stream shown in part (b) of FIG. 6, in three stages of the hierarchies 0 to 2, the hierarchy 3, and the hierarchy 4. Here, "Tid" represents temporal_id. Part (b) of FIG. 7 shows a display expectation (display order) in the case where pictures of the hierarchies 0 to 2, i.e., partial hierarchies when Tid=0 to 2 are selectively decoded. Further, part (c) of FIG. 7 shows a display expectation (display order) in the case where pictures of the hierarchies 0 to 3, i.e., partial hierarchies when Tid=0 to 3 are selectively decoded. Furthermore, part (d) of FIG. 7 shows a display expectation (display order) in the case where pictures of the hierarchies 0 to 4, i.e., all the hierarchies when Tid=0 to 4 are selectively decoded.

To perform decoding processing on the encoded stream shown in part (a) of FIG. 7 according to a decoding capability, a decoding capability having temporal resolution at a full rate is required. However, when decoding where Tid=0 to 2 is performed, a decoder having a ¼ decoding capability for the encoded full temporal resolution should perform processing. Further, when decoding where Tid=0 to 3 is performed, a decoder having a ½ decoding capability for the encoded full temporal resolution should perform processing.

However, when pictures belonging to a low hierarchy and referenced in the hierarchical encoding are successive and encoded at a timing of a full temporal resolution, the capability of a decoder that performs partial decoding does not catch up width the encoding. This situation corresponds to a period A in part (a) of FIG. 7. A decoder that decodes partial hierarchies where Tid=0 to 2 or Tid=0 to 3 performs decoding/display with a capability having ¼ or ½ of the time axis, as shown in the example of display. Thus, pictures successive at the encoded full temporal resolution in the period A cannot be decoded.

Ta represents a time required for decoding processing on a picture-by-picture basis in the decoder that decodes Tid=0 to 2. Tb represents a time required for decoding processing on a picture-by-picture basis in the decoder that decodes Tid=0 to 3. Tc represents a time required for decoding processing on a picture-by-picture basis in the decoder that decodes Tid=0 to 4 (all hierarchies). A relationship of those times is Ta>Tb>Tc.

In this embodiment, as will be described later, when the reception apparatus 200 includes a decoder having a low decoding capability and selectively decodes low hierarchy pictures, the reception apparatus 200 is provided with a function of rewriting a decoding time stamp (DTS) and adjusting decoding intervals of the low hierarchy pictures. This enables realistic decoding processing even in a decoder having a low decoding capability.

Referring back to FIG. 2, the coded picture buffer (cpb) 103 temporarily stores the video stream generated in the encoder 102, the video stream including encoded data of pictures of each hierarchy. The multiplexer 104 reads the video stream stored in the coded picture buffer 103 and converts the video stream into PES packets and further into transport packets to be multiplexed, thus obtaining a transport stream TS as a multiplexed stream.

In this embodiment, as described above, the multiple hierarchies are divided into a predetermined number of, i.e., two or more hierarchy groups. The multiplexer 104 inserts the identification information into the header of a PES packet (PES header). The identification information is for identifying a hierarchy group to which encoded image data of each picture included in the video stream belongs. This identification information enables the reception side to take in a buffer and process only encoded image data of pictures of a hierarchy group corresponding to a decoding capability of the reception side.

For example, when the multiple hierarchies are divided into a low hierarchy group and a high hierarchy group, the multiplexer 104 uses a 1-bit field of a known PES priority (PES_priority), located in the PES header. When the PES payload includes encoded image data of a picture of a hierarchy group on the low hierarchy side, the 1-bit field is set to "1", that is, set to have a high degree of priority. On the other hand, when the PES payload includes encoded image data of a picture of a hierarchy group on the high hierarchy side, the 1-bit field is set to "0", that is, set to have a low degree of priority.

As described above, the transport stream TS includes a single video stream including encoded image data of a picture of each hierarchy, or a predetermined number of video streams each including encoded image data of a picture of each hierarchy group described above. The multiplexer 104 inserts hierarchy information and stream configuration information into the transport stream TS.

The transport stream TS includes a PMT (Program Map Table) as one kind of PSI (Program Specific Information). In the PMT, a video elementary loop (video ES1 loop) including information related to each video stream exists. In the video elementary loop, information such as a stream type and a packet identifier (PID), and a descriptor that describes information related to that video stream are arranged to correspond to each video stream.

The multiplexer 104 inserts an HEVC descriptor (HEVC_descriptor) as one of the descriptor and further inserts a scalability extension descriptor (scalability_extension_descriptor) that is newly defined.

FIG. 8 shows a structural example (Syntax) of the HEVC descriptor (HEVC_descriptor). Further, FIG. 9 shows details (Semantics) of main information in the structural example.

An 8-bit field of "descriptor_tag" shows a descriptor type and shows an HEVC descriptor here. An 8-bit field of "descriptor_length." shows the length (size) of the descriptor. As the length of the descriptor, a subsequent number of bytes is shown.

An 8-bit field of "level_idc" shows a level specification value of a bit rate. Further, when "temporal_layer_subset_flag=1", a 5-bit field of "temporal_id_min" and a 5-bit field of "temporal_id_max" are present. "temporal_id_min" shows a value of temporal_id on the lowest hierarchy of hierarchically encoded data included in a corresponding video stream. "temporal_id_max" shows a value of temporal_id on the highest hierarchy of hierarchically encoded data included in a corresponding video stream.

A 1-bit field of "level_constrained_flag" is newly defined and represents that a level specification value (general_level_idc) of a bit stream included in a NAP unit of the VPS may change on a picture-by-picture basis. "1" represents a possibility of change, and "0" represents no change.

As described above, for example, "general_level_idc" is used as identification information of a hierarchy group to which encoded image data belongs, when the multiple hierarchies are divided into a predetermined number of, i.e., two or more hierarchy groups. Therefore, in the case of a video stream including encoded image data of pictures of multiple hierarchy groups, "general_level_idc" may change on a picture-by-picture basis. On the other hand, in the case of a video stream including encoded image data of pictures of a single hierarchy group, "general_level_idc" does not change on a picture-by-picture basis. Alternatively, "sublayer_level_idc" is given to each sublayer, and the decoder reads packets of temporal_id within a decodable range, and thus data of a corresponding hierarchy is processed.

A 3-bit field of "scalability_id" is newly defined and is an ID representing a scalability given to each stream when multiple video streams supply a scalable service. "0" represents a base stream, and "1" to "7" each represent an ID that increases according to the degree of scalability from the base stream.

FIG. 10 shows a structural example (Syntax) of a scalability extension descriptor (scalability_extension_descriptor). Further, FIG. 11 shows details (Semantics) of main information in the structural example.

An 8-bit field of "scalability_extension_descriptor_tag" shows a descriptor type and shows a scalability extension descriptor here. An 8-bit field of "scalability_extension_descriptor_length" shows the length (size) of the descriptor. As the length of the descriptor, a subsequent number of bytes is shown. A 1-bit field of "extension_stream_existing_flag" is a flag showing the presence of an extension service by a different stream. "1" represents that an extended stream is present, and "0" represents that an extended stream is absent.

A 3-bit field of "extension_type" shows a type of extension. "001" represents that extension is time direction scalable. "010" represents that extension is spatial direction scalable. "011" represents that extension is bit rate scalable.

A 4-bit field of "number_of_streams" shows the total number of streams involving a distribution service. A 3-bit field of "scalability_id" is an ID representing a scalability given to each stream when multiple video streams supply a scalable service. "0" represents a base stream, and "1" to "7" each represent an ID that increases according to the degree of scalability from the base stream.

A 3-bit field of "number_of_layers" shows the total number of hierarchies of the stream. An 8-bit field of "sublayer_level_idc shows a value of level_idc at which an appropriate sublayer represented by temporal_id includes a layer lower than the sublayer to be handled by the decoder. "Number of layers" contains all values of "Nuh_temporal_id_plus1" of the NAL unit header, and when the demultiplexer (demuxer) detects this, it is possible to preliminarily recognize to which hierarchy a decoder corresponding to a predetermined level_idc can perform decoding by using "sublayer_level_idc".

As described above, in this embodiment, the level specification value (general_level_idc) of a bit rate included in the SPS and the like are used as identification information of a hierarchy group to which encoded image data belongs, when the multiple hierarchies are divided into a predetermined number of, i.e., two or more hierarchy groups. A value of the level specification value of each hierarchy group is set to a value corresponding to a frame rate constituted of pictures of this hierarchy group and pictures of all the hierarchy groups on the hierarchy side lower than this hierarchy group.

Figure 12:
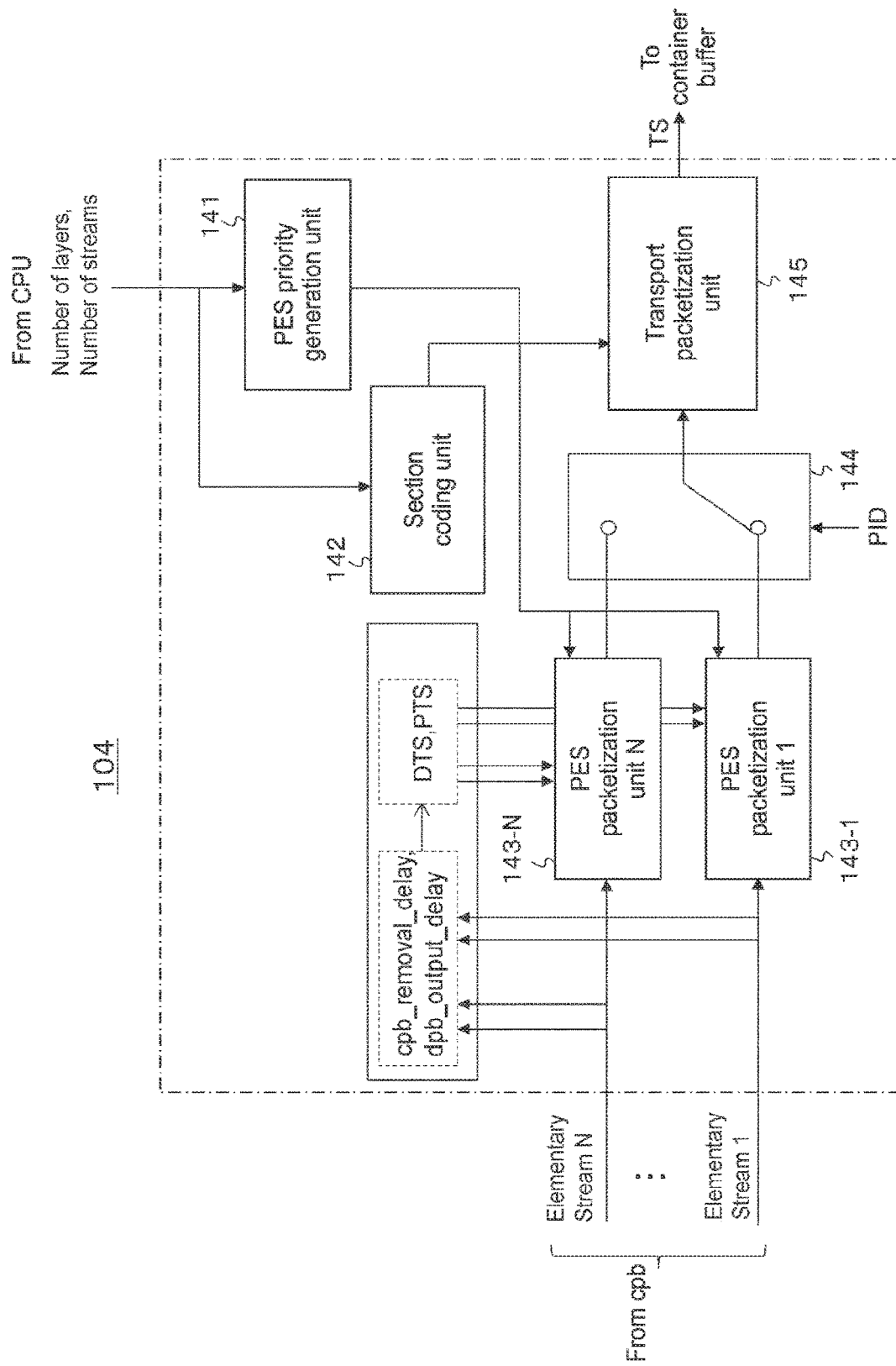
FIG. 12 is a block diagram showing a configuration example of a multiplexer.

FIG. 12 shows a configuration example of the multiplexer 104. The multiplexer 104 includes a PES priority generation unit 141, a section coding unit 142, PES packetization units 143-1 to 143-N, a switch unit 144, and a transport packetization unit 145.

The PES packetization units 143-1 to 143-N respectively read video streams 1 to N stored in the coded picture buffer 103 and generate PES packets. At that time, the PES packetization units 143-1 to 143-N provide time stamps of a DTS (Decoding Time Stamp)) and a PTS (Presentation Time Stamp) to the PES headers on the basis of HRD information of the video streams 1 to N. In this case, "cpu_removal_delay" and "dpb_output_delay" of each picture are referenced, converted into a DTS and a PTS with accuracy synchronized with a SIC (System Time Clock) time, and arranged at a predetermined position of the PES header.

Information on the number of hierarchies (Number of layers) and the number of streams (Number of streams) are supplied to the PES priority generation unit 141 from the CPU 101. The PES priority generation unit 141 generates degree-of-priority information of each hierarchy group, in the case where the multiple hierarchies represented by the number of hierarchies are divided into a predetermined number of, i.e., two or more hierarchy groups. For example, when the multiple hierarchies are divided into two, the PES priority generation unit 141 generates a value ("1" for the low hierarchy group, "0" for the high hierarchy group) to be inserted into a 1-bit field of "PES_priority" of the header of a PES packet.

The degree-of-priority information of each hierarchy group, which is generated in the PES priority generation unit 141, is supplied to the PES packetization units 143-1 to 143-N. The PES packetization units 143-1 to 143-N insert the degree of priority of each hierarchy group, as identification information, into the header of a PES packet including encoded image data of a picture of that hierarchy group.

It should be noted that processing of inserting the degree of priority of a hierarchy group to which the picture belongs into the header of the PES packet as header information on a picture-by-picture basis in such a manner may be limited to a case where a single video stream (single stream) is generated in the encoder 102. In this case, processing is performed only in the PES packetization unit 143-1.

The switch unit 144 selectively takes out the PES packet generated in the DES packetization units 143-1 to 143-N on the basis of a packet identifier (PID) and transmits the PES packet to the transport packetization unit 145. The transport packetization unit 145 generates a TS packet including the PES packet in the payload and obtains a transport stream TS.

The section coding unit 142 generates various types of section data to be inserted into the transport stream TS. Information on the number of hierarchies (Number of layers) and the number of streams (Number of streams) are supplied to the section coding unit 142 from the CPU 101. On the basis of the information, the section coding unit 142 generates the above-mentioned HEVC descriptor (HEVC_descriptor) and scalability extension descriptor (scalability_extension_descriptor).

The section coding unit 142 transmits various types of section data to the transport packetization unit 145. The transport packetization unit 145 generates a TS packet including this section data and inserts the TS packet into the transport stream TS.

Figure 13:
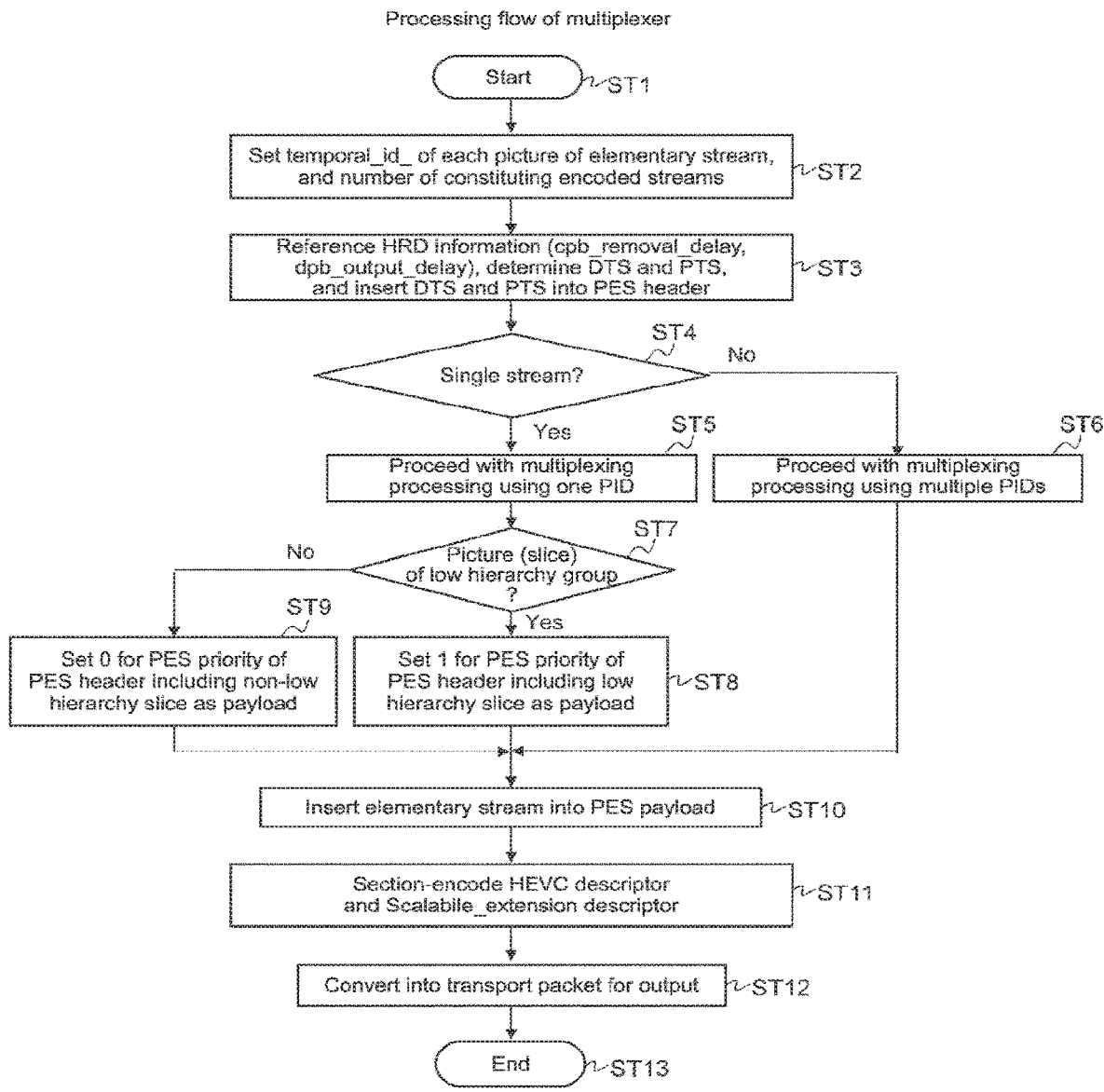
FIG. 13 is a diagram showing an example of a processing flow of the multiplexer.

FIG. 13 shows a processing flow of the multiplexer 104. This an example in which the multiple hierarchies are divided into two of a low hierarchy group and a high hierarchy group. The multiplexer 104 starts processing in Step ST1 and then moves to processing of Step ST2. In Step ST2, the multiplexer 104 sets temporal_id_ of each picture of the video stream (video elementary stream) and the number of constituting encoded streams.

Next, in Step ST3, the multiplexer 104 references HRD information (cpu_removal_delay,dpb_output_delay), determines DTS and PTS, and inserts the DTS and the PTS into a predetermined position of the PES header.

Next, in Step ST4, the multiplexer 104 determines whether the stream is a single stream (single video stream) or not. When the stream is a single stream, in Step ST5, the multiplexer 104 proceeds with multiplexing processing using one PID (packet identifier), and then moves to processing of Step ST7.

In Step ST7, the multiplexer 104 determines whether each picture is a picture (slice) of a low hierarchy group or not. When each picture is a picture of a low hierarchy group, in Step ST8, the multiplexer 104 sets "1" for "PES_priority" of the header of a PES packet including encoded image data of that picture in the payload. On the other hand, when each picture is a picture of a high hierarchy group (non-low hierarchy group), in Step ST9, the multiplexer 104 sets "0" for "PES_priority" of the header of a PES packet including encoded image data of that picture in the payload. The multiplexer 104 moves to processing of Step ST10 after the processing of Steps ST8 and ST9.

Here, an association between a picture and a slice will be described. The picture is a concept and the same as the slice in a structural definition. One picture can be divided into multiple slices, but the multiple slices are the same to serve as an access unit, as found from a parameter set.

When the stream is not a single stream in Step ST4 described above, in Step ST6, the multiplexer 104 proceeds with the multiplexing processing using multiple packet PIDs (packet identifier), and then moves to processing of Step ST10. In Step ST10, the multiplexer 104 inserts the encoded stream (video elementary stream) into the PES payload and converts the encoded stream into PES packets.

Next, in Step ST11, the multiplexer 104 codes the HEVC descriptor, the scalability extension descriptor, and the like. The multiplexer 104 then converts those descriptors into transport packets in Step ST12, and obtains a transport stream TS. The multiplexer 104 then terminates the processing in Step ST13.

Figure 14:
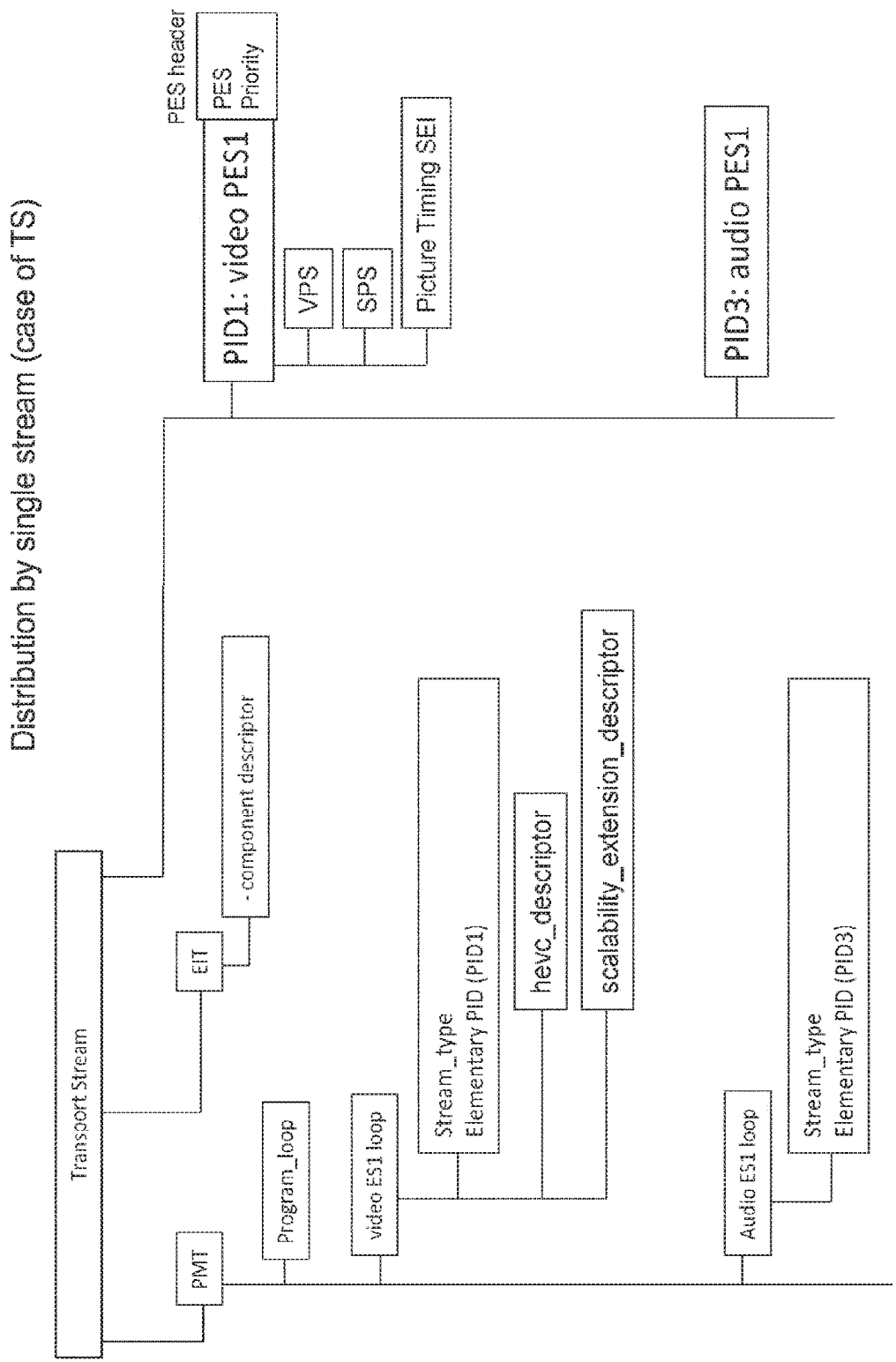
FIG. 14 is a diagram showing a configuration example of a transport stream TS when distribution by a single stream is performed.

FIG. 14 shows a configuration example of a transport stream TS when distribution by a single stream is performed. This transport stream TS includes one video stream. In other words, in this configuration example, a PES packet "video PES1" or a video stream including encoded image data by HEVC, for example, of pictures of the multiple hierarchies and a PES packet "audio PES1" of an audio stream exist.

In the encoded image data of each picture, the NAL units of VPS, SPS, SEI, and the like exist. As described above, in the header of the NAL unit of each picture, temporal_id representing a hierarchy of that picture is inserted. Further, for example, the VPS includes the level specification value (general_level_idc) of a bit rate. Further, for example, picture timing SEI includes "cpb_removal_delay" and "dpb_output_delay".

Further, in the header of the PES packet (PES header), a field of one bit showing the degree of priority of "PES_priority" exists. By this "PES_priority", whether encoded image data of a picture included in the PES payload is of a picture of the low hierarchy group or of a picture of the high hierarchy group is distinguishable.

Further, the transport stream TS contains a PMT (Program Map Table) as one type of PSI (Program Specific Information). This PSI is information describing to which program each elementary stream included in the transport stream belongs.

In the PMT, a program loop that describes information related to the entire program exists. Further, in the PMT, an elementary loop including information related to each elementary stream exists. In this configuration example, a video elementary loop (video ES1 loop) and an audio elementary loop (audio ES1 loop) exist.

In the video elementary loop, information such as a stream type and packet identifier (PID), and a descriptor that describes information related to that video stream are arranged to correspond to the video stream (video PES1). As one descriptor, the above-mentioned HEVC descriptor (HEVC_descriptor) and scalability extension descriptor (scalability_extension_descriptor) are inserted.

Referring back to FIG. 2, the transmission unit 105 modulates the transport stream TS in a modulation method suitable for broadcasting such as QPSK/OFDM, and transmits an RF-modulated signal from a transmission antenna.

The operation of the transmission apparatus 100 shown in FIG. 2 will be described briefly. Uncompressed moving image data is input to the encoder 102. In the encoder 102, hierarchical encoding is performed on the moving image data. In other words, in the encoder 102, image data of pictures constituting the moving image data are sorted into multiple hierarchies and encoded, so that a video stream including encoded image data of the pictures of the hierarchies is generated. At that time, the encoding is performed such that a referenced picture belongs to a hierarchy of the referenced picture and/or a hierarchy lower than the hierarchy of the referenced picture.

In the encoder 102, a single video stream including encoded image data of pictures of each hierarchy is generated. Alternatively, the multiple hierarchies are divided into a predetermined number of, i.e., two or more hierarchy groups, and a predetermined number of video streams each including encoded image data of pictures of each hierarchy group are generated.

Further, the video stream including encoded data of pictures of each hierarchy, which is generated in the encoder 102, is supplied to the coded picture buffer (cpb) 103 and temporarily stored. In the multiplexer 104, the video stream stored in the coded picture buffer 103 is read, converted into PES packets, further converted into transport packets to be multiplexed, thus obtaining a transport stream TS as a multiplexed stream.

In the multiplexer 104, for example, in the case of a single video stream (single stream), the identification information for identifying a hierarchy group to which encoded image data of each picture of the video stream belongs is inserted into the header of the PES packet (PES header). For example, when the multiple hierarchies are divided into two of a low hierarchy group and a high hierarchy group, a 1-bit field of PES priority (PES_priority) of the PES header is used.

Further, in the multiplexer 104, the hierarchy information and the stream configuration information are inserted into the transport stream TS. In other words, in the multiplexer 104, the HEVC descriptor (HEVC_descriptor) and the scalability extension descriptor (scalability_extension_descriptor) are inserted into a video elementary loop corresponding to each video stream.

The transport stream TS generated in the multiplexer 104 is transmitted to the transmission unit 105. In the transmission unit 105, the transport stream TS is modulated in a modulation method suitable for broadcasting such as QPSK/OFDM, and an RF-modulated signal is transmitted from a transmission antenna.

"Configuration of Reception Apparatus"

Figure 15:
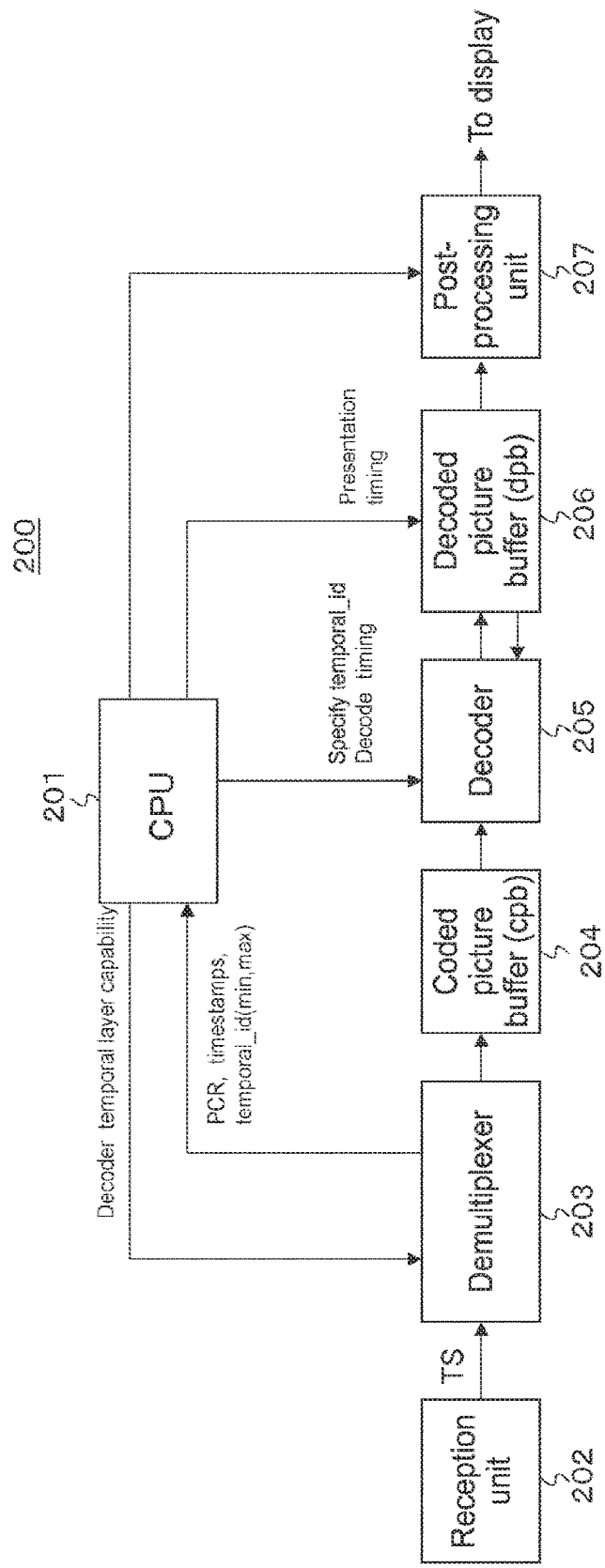
FIG. 15 is a block diagram showing a configuration example of a reception apparatus.

FIG. 15 shows a configuration example or the reception apparatus 200. The reception apparatus 200 includes a CPU (Central Processing Unit) 201, a reception unit 202, a demultiplexer 203, and a coded picture buffer (cpb) 204. Further, the reception apparatus 200 includes a decoder 205, a decoded picture buffer (dpb) 206, and a post-processing unit 207. The CPU 201 constitutes a control unit and controls operations of respective units of the reception apparatus 200.

The reception unit 202 demodulates the RF-modulated signal received by an reception antenna and acquires the transport stream TS. The demultiplexer 203 selectively takes out the encoded image data of a picture of a hierarchy group corresponding to a decoding capability (Decoder temporal layer capability) from the transport stream TS and transmits the encoded image data to the coded picture buffer (cpb) 204.

Figure 16:
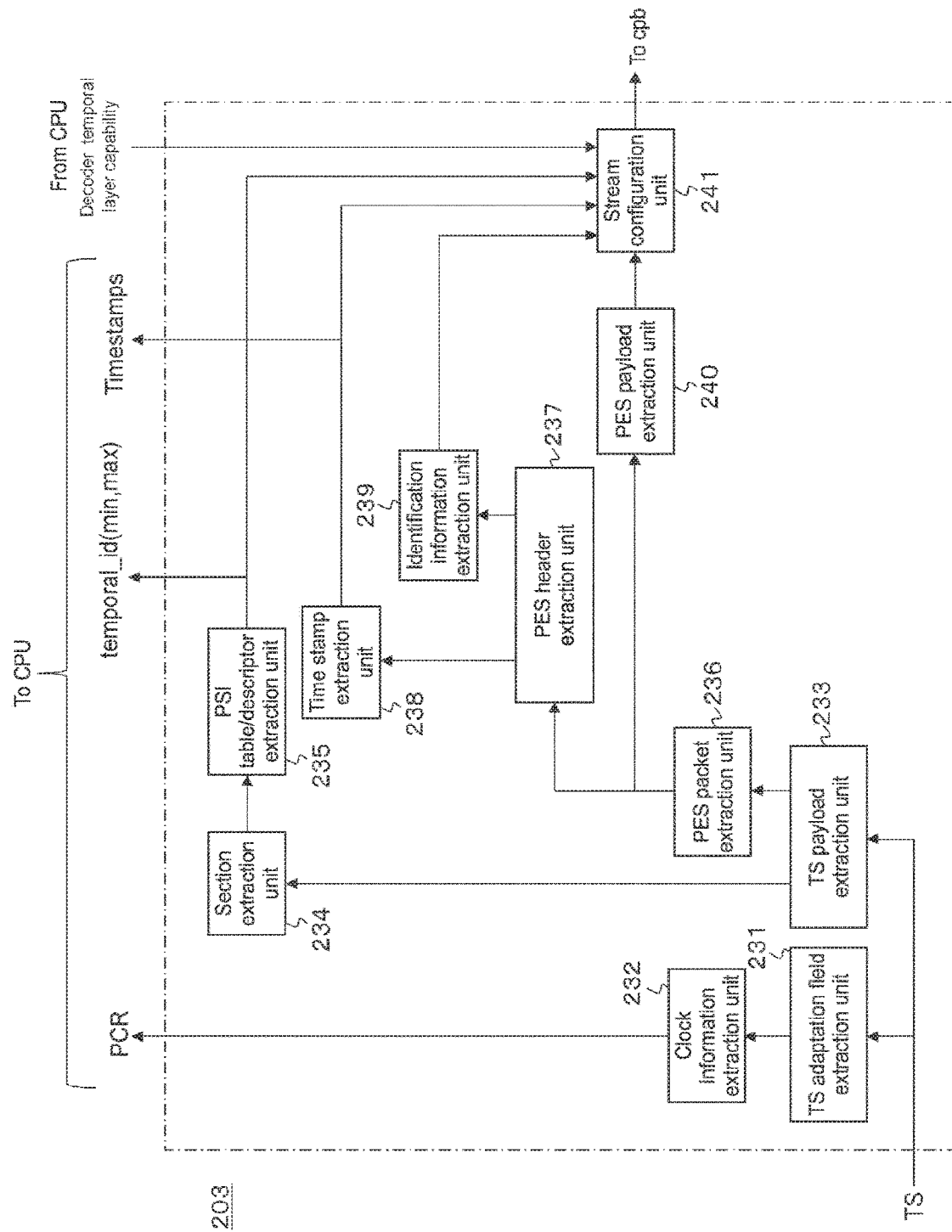
FIG. 16 is a block diagram showing a configuration example of a demultiplexer.

FIG. 16 shows a configuration example of the demultiplexer 203. The demultiplexer 203 includes a TS adaptation field extraction unit 231, a clock information extraction unit 232, a TS payload extraction unit 233, a section extraction unit 234, a PSI table/descriptor extraction unit 235, and a PES packet extraction unit 236. Further, the demultiplexer 203 includes a PES header extraction unit 237, a time stamp extraction unit 238, an identification information extraction unit 239, a PES payload extraction unit 240, and a stream configuration unit (stream composer) 241.

The TS adaptation field extraction unit 231 extracts the adaptation field from a TS packet including the adaptation field of the transport stream TS. The clock information extraction unit 232 extracts the PCR (Program Clock Reference) from an adaptation field including a PCR and transmits the PCR to the CPU 201.

The TS payload extraction unit 233 extracts the TS payload from a TS packet including a TS payload in the transport stream TS. The section extraction unit 234 extracts the section data from a TS payload including section data. The PSI table/descriptor extraction unit 235 analyzes the section data extracted in the section extraction unit 234 and extracts a PSI table or a descriptor. The PSI table/descriptor extraction unit 235 then transmits a minimum value (min) and a maximum value (max) of temporal_id to the CPU 201 and also to the stream configuration unit 241.

The PES packet extraction unit 236 extracts the PES packet from a TS payload including a PES packet. The PES header extraction unit 237 extracts a PES header from the PES packet extracted in the PES packet extraction unit 236. The time stamp extraction unit 238 extracts time stamps (DTS, PTS) inserted into the PES header on a picture-by-picture basis and transmits the time stamps to the CPU 201 and also to the stream configuration unit 241.

The identification information extraction unit 239 extracts identification information for identifying a hierarchy group to which a picture belongs, the identification information being inserted into the PES header on a picture-by-picture basis, and transmits the identification information to the stream configuration unit 241. For example, when the multiple hierarchies are divided into two of a low hierarchy group and a high hierarchy group, the identification information extraction unit 239 extracts degree-of-priority information of a 1-bit field of "PES_priority" of the PES header and transmits the degree-of-priority information to the stream configuration unit 241. It should be noted that the identification information is definitely inserted on the transmission side when a single video stream is included in the transport stream TS, but may not be inserted on the transmission side when multiple video streams are included in the transport stream TS.

The PES payload extraction unit 240 extracts a PES payload, that is, encoded image data of a picture of each hierarchy, from the PES packet extracted in the PES packet extraction unit 236. The stream configuration unit 241 selectively takes out encoded image data of a picture of a hierarchy group corresponding to a decoding capability (Decoder temporal layer capability) from the encoded image data of a picture of each hierarchy taken out in the PES payload extraction unit 240, and transmits the encoded image data to the coded picture buffer (cpb) 204. In this case, the stream configuration unit 241 references the hierarchy information and the stream configuration information obtained in the PSI table/descriptor extraction unit 235, the identification information (degree-of-priority information) extracted in the identification information extraction unit 239, and the like.

For example, it is assumed that a frame rate of a video stream (encoded stream) included in the transport stream TS is 120 fps. For example, it is assumed that the multiple hierarchies are divided into two of a hierarchy group on the low hierarchy side and a hierarchy group on a high hierarchy side, and a frame rate of pictures of each hierarchy group is 60 fps. For example, in the example of the hierarchical encoding described above in FIG. 3, the hierarchies 0 to 3 are assumed as a hierarchy group on the low hierarchy side, for which a decoder that supports level_idc of 60 fps can perform decoding. Further, the hierarchy 4 is assumed as a hierarchy group on the high hierarchy side, for which a decoder that supports level_idc of 120 fps can perform decoding.

In this case, in the transport stream TS, a single video stream (encoded stream) including encoded data of pictures of each hierarchy is included, or two video streams (encoded streams) of a base stream (B_str) including encoded image data of pictures of the hierarchy group on the low hierarchy side and an extended stream (E_str) including encoded image data of pictures of the hierarchy group on the high hierarchy side are included.

When the decoding capability supports 120 fps, the stream configuration unit 241 takes out the encoded image data of pictures of all the hierarchies and transmits the encoded image data to the coded picture buffer (cpb) 204. On the other hand, when the decoding capability does not support 120 fps but supports 60 fps, the stream configuration unit 241 takes out only encoded image data of pictures of the hierarchy group on the low hierarchy side and transmits the encoded image data to the coded picture buffer (cpb) 204.

Figure 17:
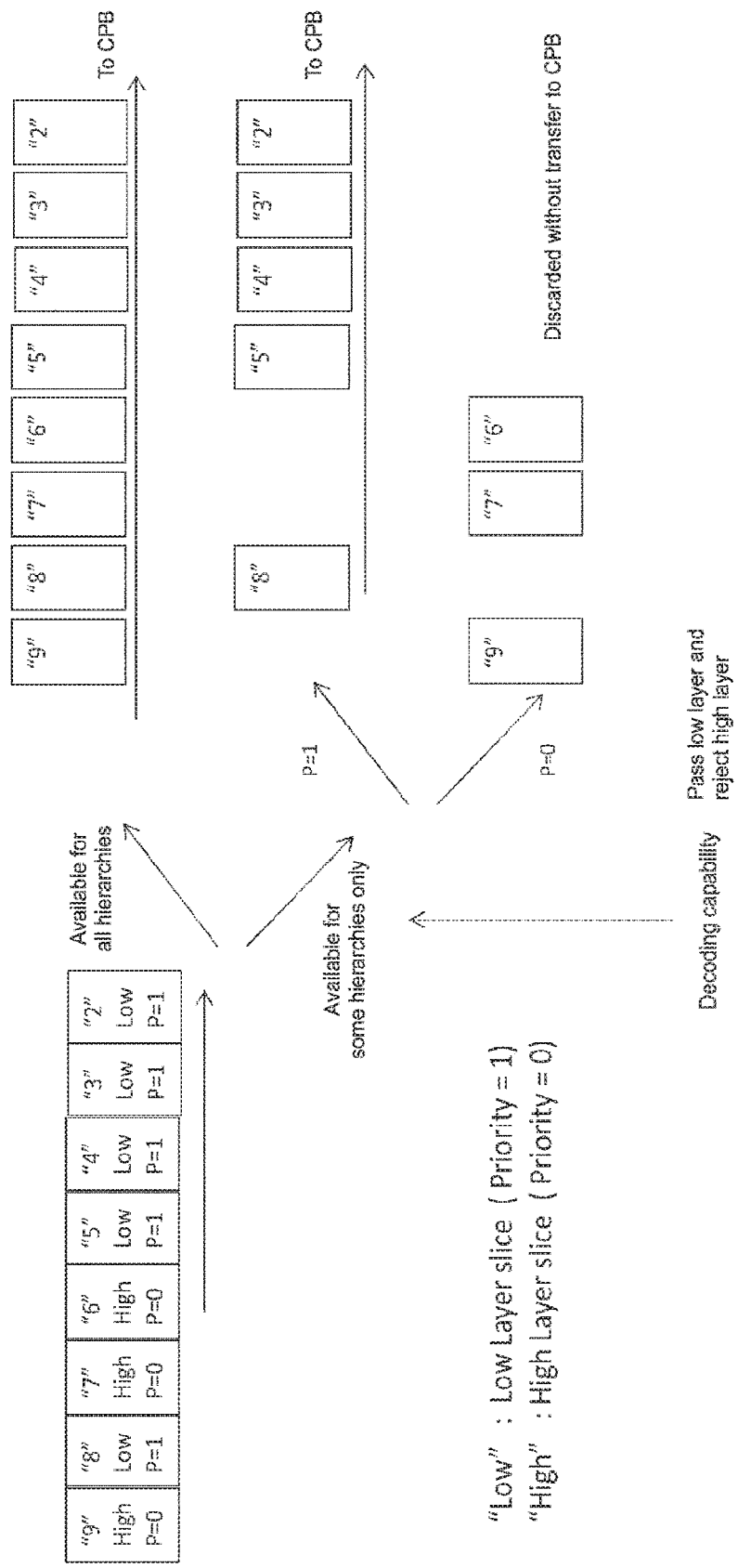
FIG. 17 is a diagram showing a case where a single video stream (encoded stream) is included in a transport stream TS.

FIG. 17 shows an example of picture (slice) selection of the stream configuration unit 241 when the transport stream TS includes a single video stream (encoded stream). Here, "High" represents a picture of a hierarchy group on the high hierarchy side, and "Low" represents a picture of a hierarchy group on the low hierarchy side. Further, "P" represents "PES_priority".

When the decoding capability supports 120 fps, the stream configuration unit 241 takes out encoded image data of pictures of all the hierarchies and transmits the encoded image data to the coded picture buffer (cpb) 204. On the other hand, when the decoding capability supports not 120 fps but 60 fps, the stream configuration unit 241 performs filtering based on the "PES_priority", takes out only pictures of the hierarchy group on the low hierarchy side where P=1, and transmits the pictures to the coded picture buffer (cpb) 204.

Figure 18:
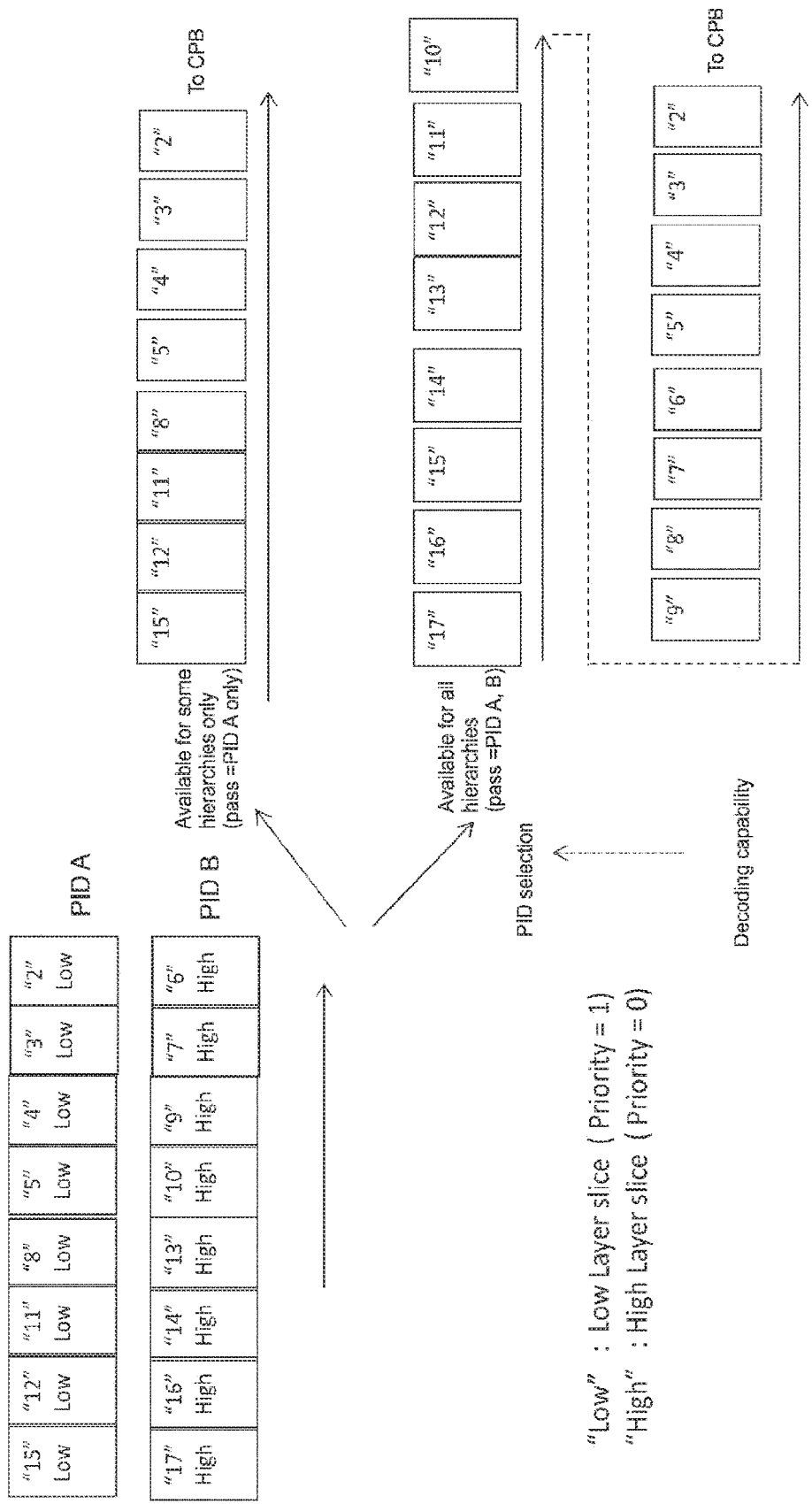
FIG. 18 is a diagram showing a case where two video streams (encoded stream) of a base stream and an extended stream are included in a transport stream TS.

FIG. 18 shows an example of picture (slice) selection of the stream configuration unit 241 when the transport stream TS includes two video streams (encoded streams) of a base stream and an extended stream. Here, "High" represents a picture of a hierarchy group on the high hierarchy side, and "Low" represents a picture of a hierarchy group on the low hierarchy side. Further, it is assumed that a packet identifier (PID) of the base stream is PID A, and a packet identifier (PID) of the extended stream is PID B.

When the decoding capability supports 120 fps, the stream configuration unit 241 takes out encoded image data of pictures of all the hierarchies and transmits the encoded image data to the coded picture buffer (cpb) 204. In this case, the stream configuration unit 241 converts the encoded image data of each picture into one stream on the basis of decoding timing information and transmits the stream to the coded picture buffer (cpb) 204.

In such a case, the value of the DTS is considered as a decoding timing, and the streams are collected to one such that the values monotonically increase between the pictures. Such processing of collecting the pictures into one stream may be performed on multiple streams that are read from multiple coded picture buffers (cpb) 204 provided to correspond to the number of streams, and decoding processing may be performed on that one stream.

On the other hand, when the decoding capability supports not 120 fps but 60 fps, the stream configuration unit 241 performs filtering based on the packet identifier (PID), takes out only pictures of the hierarchy group on the low hierarchy side having PID A, and transmits the pictures to the coded picture buffer (cpb) 204.

It should be noted that the stream configuration unit 241 has a function of selectively rewriting a decoding time stamp of the encoded image data of each picture to be transmitted to the coded picture buffer (cpb) 204 and adjusting decoding intervals of the low hierarchy pictures. This enables realistic decoding processing even in a decoder 205 having a low decoding capability.

Figure 19:
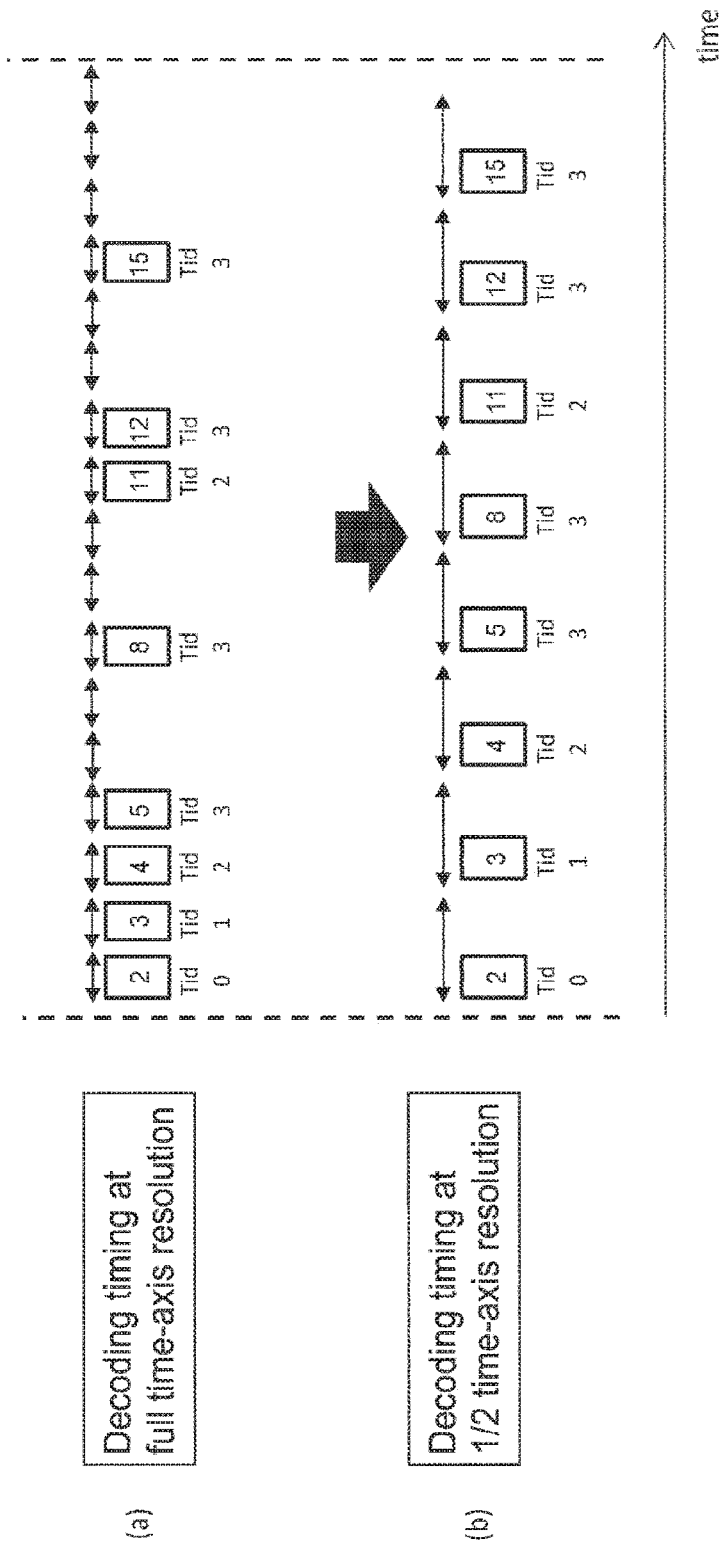
FIG. 19 is a diagram for describing a function of rewriting a decoding time stamp of encoded image data of each picture and adjusting decoding intervals of low hierarchy pictures.

FIG. 19 shows a case where the hierarchy groups are divided into the hierarchy group on the low hierarchy side and the hierarchy group on the high hierarchy side in the example of hierarchical encoding shown in FIG. 3 and where encoded image data or pictures belonging to the low hierarchy group are selectively taken out in the stream configuration unit 241 and transmitted to the coded picture buffer (cpb) 204.

Part (a) of FIG. 19 shows a decoding timing before the decoding intervals are adjusted. In this case, the decoding intervals of pictures vary, and the shortest decoding intervals are equal to the decoding intervals at full resolution of 120 fps. In contrast to this, part (b) of FIG. 19 shows a decoding timing after the decoding intervals are adjusted. In this case, the decoding intervals of pictures are made equal, and the decoding intervals are ½ of the decoding intervals at full resolution. In such a manner, in each hierarchy, the decoding intervals are adjusted according to the capability of a target decoder.

Figure 20:
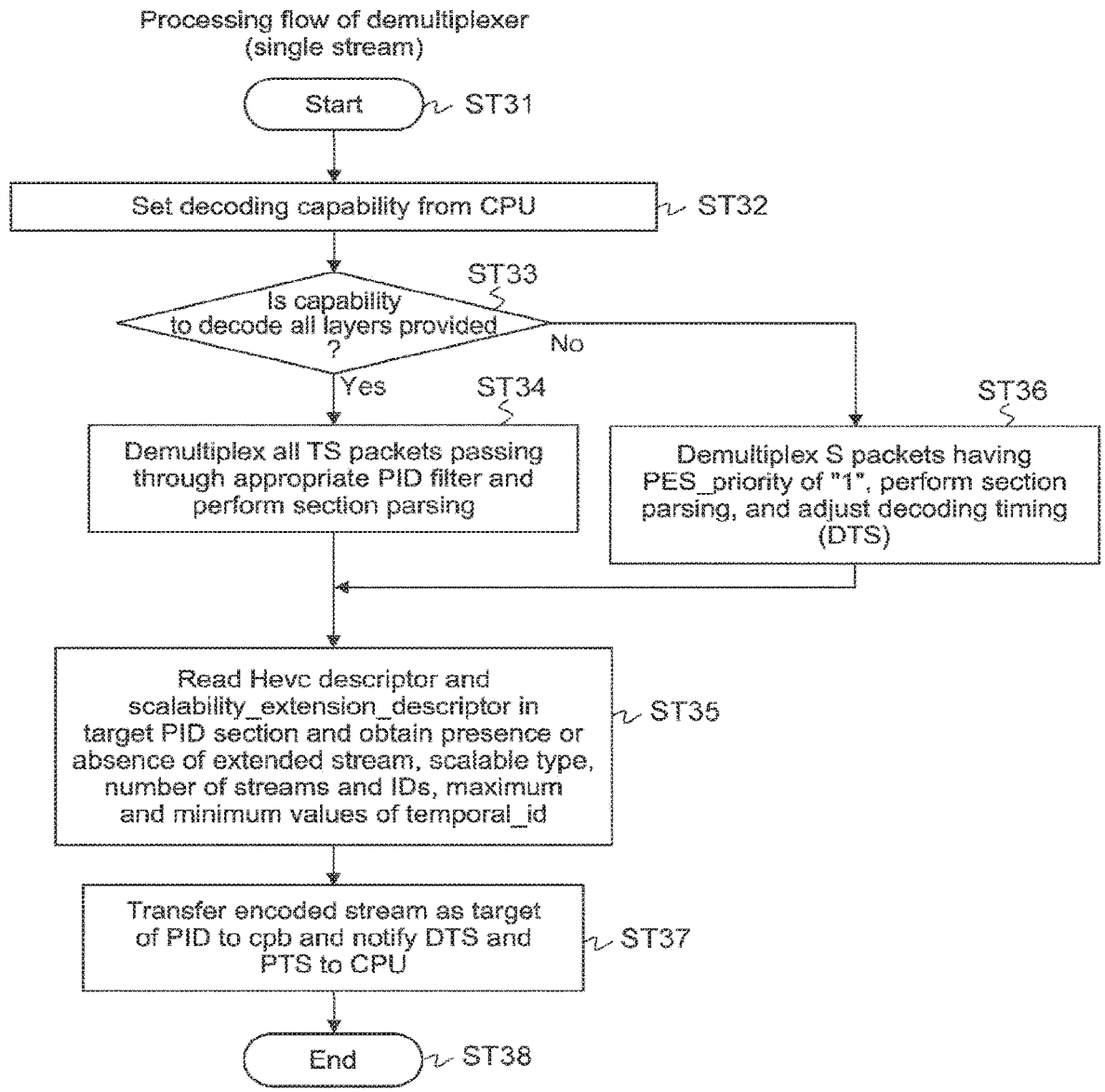
FIG. 20 is a diagram showing an example of a processing flow (1 frame) of the demultiplexer.

FIG. 20 shows an example of a processing flow of the demultiplexer 203. The processing flow shows a case where the transport stream TS includes a single video stream (encoded stream).

The demultiplexer 203 starts processing in Step ST31 and then moves to processing of Step ST32. In Step ST32, a decoding capability (Decoder temporal layer capability) is set from the CPU 201. Next, the demultiplexer 203 determines in Step ST33 whether a capability to decode all the hierarchies (layers) is provided or net.

When a capability to decode all the hierarchies is provided, the demultiplexer 203 demultiplexes all TS packets that pass through an appropriate PID filter and performs section parsing in Step ST34. The demultiplexer 203 then moves to processing of Step ST35.

In Step ST33, when a capability to decode all the hierarchies is not provided, the demultiplexer 203 demultiplexes TS packets having "PES_priority" of "1" and performs section parsing in Step ST36. The demultiplexer 203 then moves to processing of Step ST35.

In Step ST35, the demultiplexer 203 reads the HEVC descriptor (HEVC_descriptor) and the scalability extension descriptor (scalability_extension_descriptor) in the target PID section and obtains the presence or absence of an extended stream, a scalable type, the number of streams and IDs, maximum and minimum values of temporal_id, and a decoder supporting level of each layer.

Next, the demultiplexer 203 transfers the encoded stream as a target of PID to the coded picture buffer (cub) 204 in Step ST37 and notifies the DTS and the PTS to the CPU 201. After the processing of Step ST37, the demultiplexer 203 terminates the processing in Step ST38.

Figure 21:
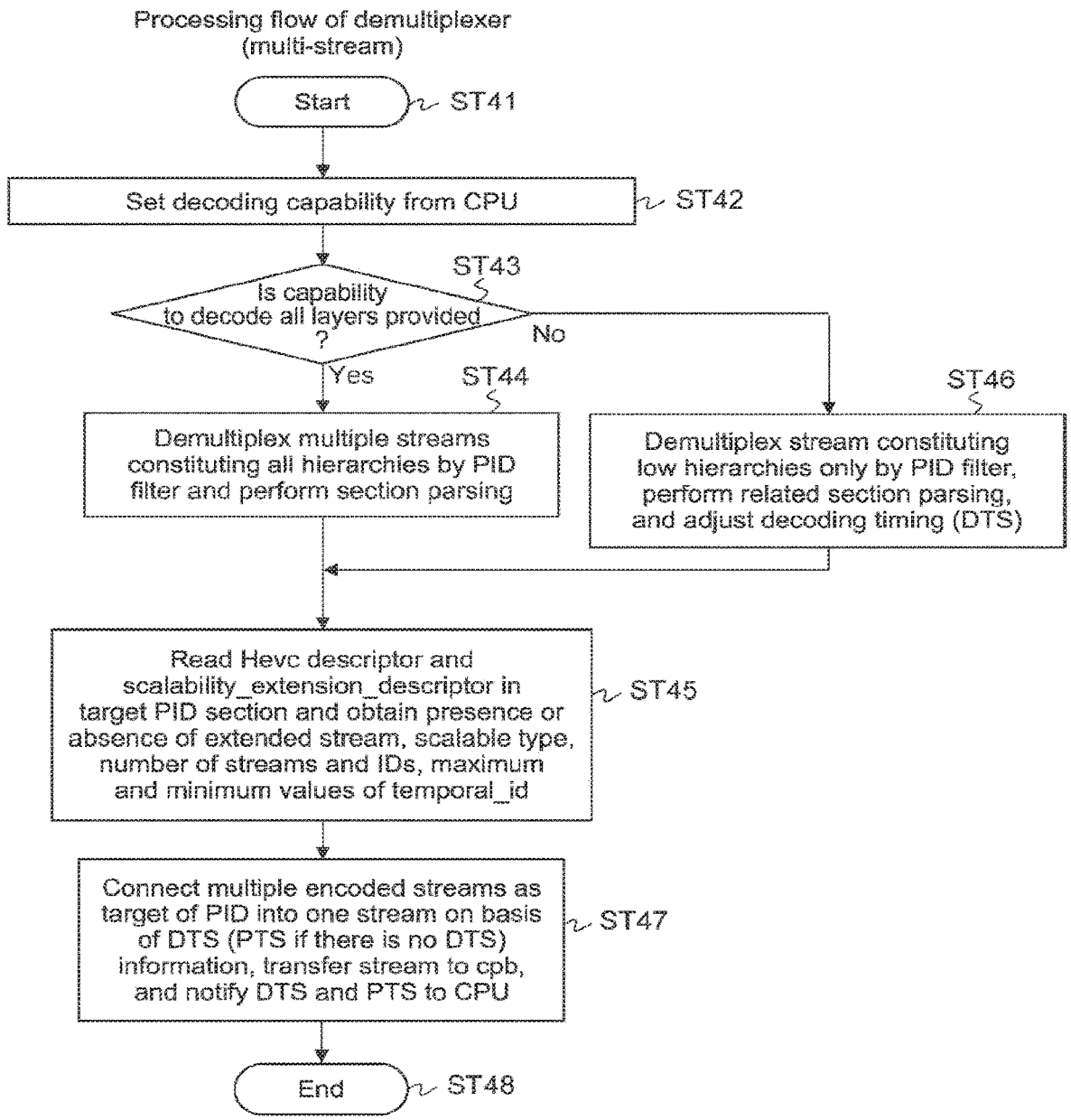
FIG. 21 is a diagram showing an example of a processing flow (2 frames) of the demultiplexer.

FIG. 21 shows an example of a processing flow of the demultiplexer 203. The processing flow shows a case where the transport stream TS includes two video streams (encoded streams) of a base stream and an extended stream.

The demultiplexer 203 starts processing in Step ST41 and then moves to processing of Step ST42. In Step ST42, a decoding capability (Decoder temporal layer capability) is set from the CPU 201. Next, the demultiplexer 203 determines in Step ST43 whether a capability to decode all the hierarchies (layers) is provided or not.

When a capability to decode all the hierarchies is provided, the demultiplexer 203 demultiplexes multiple streams constituting all the hierarchies by the PID filter and performs section parsing in Step ST44. The demultiplexer 203 then moves to processing of Step ST45.

In Step ST43, when a capability to decode all the hierarchies is not provided, the demultiplexer 203 demultiplexes a stream where PID=PID A and performs section parsing in Step ST46. The demultiplexer 203 then moves to processing of Step ST45.

In Step ST45, the demultiplexer 203 reads the HEVC descriptor (HEVC_descriptor) and the scalability extension descriptor (scalability_extension_descriptor) in the target PID section and obtains the presence or absence of an extended stream, a scalable type, the number of streams and IDs, maximum and minimum values of temporal_id, and a decoder supporting level of each layer.

Next, the demultiplexer 203 connects encoded streams as target of PID into one stream on the basis of DTS (PTS if there is no DTS) information, and transfers the stream to the coded picture buffer (cpb) 204 and also notifies the DTS and the PTS to the CPU 201 in Step ST47. After the processing of Step ST47, the demultiplexer 203 terminates the processing in Step ST48.

Referring back to FIG. 15, the coded picture buffer (cpb) 204 temporarily stores the video stream (encoded stream) taken out in the demultiplexer 203. The decoder 205 takes out encoded image data of a picture of a hierarchy specified as a hierarchy to be decoded, from the video stream stored in the coded picture buffer 204. The decoder 205 then decodes the taken encoded image data of each picture at a decoding timing of that picture and transmits the resultant data to the decoded picture buffer (dpb) 206.

Here, for the decoder 205, a hierarchy to be decoded is specified by temporal_id from the CPU 201. The specified hierarchy refers to all hierarchies included in the video stream (encoded stream) taken out in the demultiplexer 203 or to some hierarchies on the low hierarchy side, and is set by the CPU 201 automatically or set according to a user operation. Further, a decoding timing is given to the decoder 205 from the CPU 201 on the basis of a DTS (Decoding Time stamp). It should be noted that when the decoder 205 decodes encoded image data of each picture, the decoder 205 reads image data of the referenced picture from the decoded picture buffer 206 for use as necessary.

Figure 22:
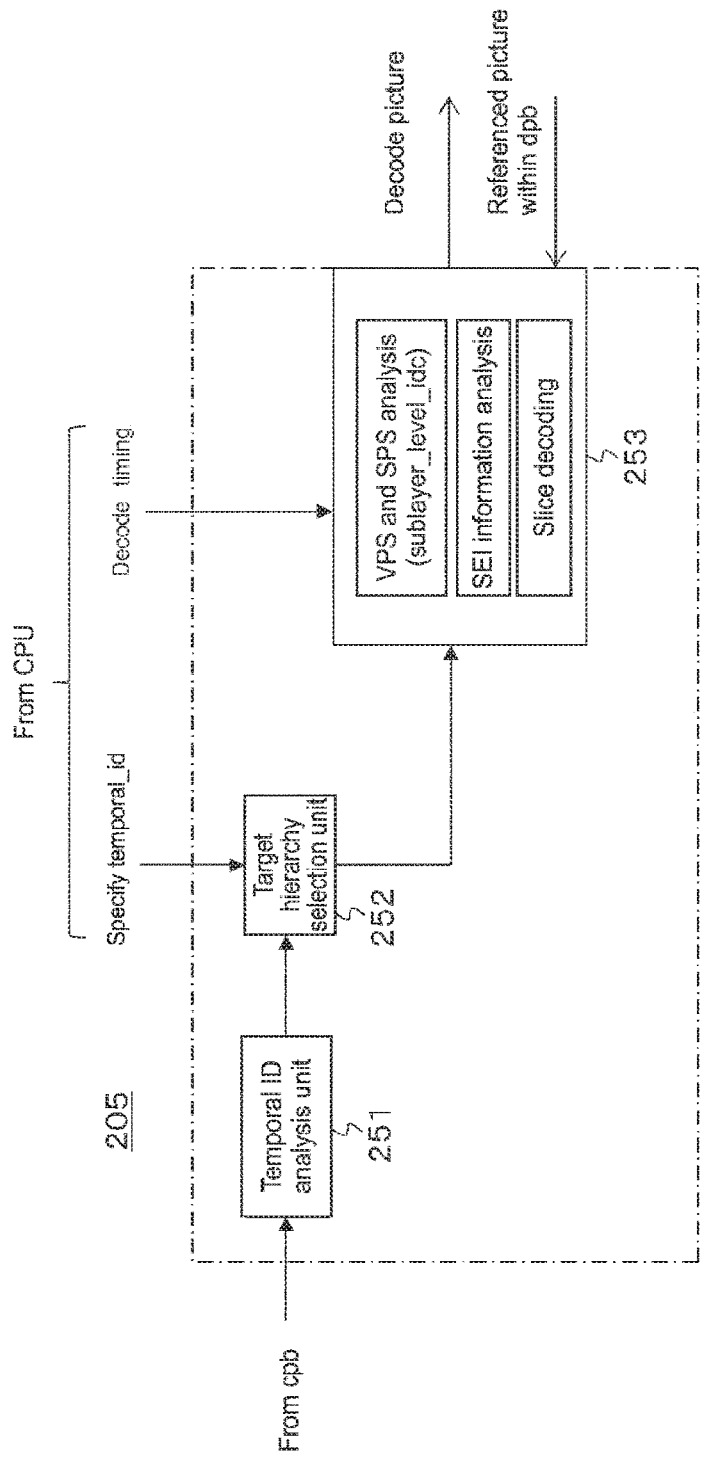
FIG. 22 is a block diagram showing a configuration example of a decoder.

FIG. 22 shows a configuration example of the decoder 205. The decoder 205 includes a temporal ID analysis unit 251, a target hierarchy selection unit 252, and a decoding unit 253. The temporal ID analysis unit 251 reads the video stream (encoded stream) stored in the coded picture buffer 204 and analyzes temporal_id inserted into the NAL unit header of the encoded image data of each picture.

The target hierarchy selection unit 252 takes out encoded image data of a picture of a hierarchy specified as a hierarchy to be decoded, from the video stream read from the coded picture buffer 204 on the basis of an analysis result of the temporal ID analysis unit 251. The decoding unit 253 decodes the encoded image data of each picture, which is taken out in the target hierarchy selection unit 252, at a decoding timing sequentially and transmits the resultant data to the decoded picture buffer (dpb) 206.

In this case, the decoding unit 253 analyzes VPS and SPS, grasps a level specification value "sublayer_level_idc" of a bit rate of each sublayer, for example, and checks whether decoding is possible within the decoding capability or not. Further, in this case, the decoding unit 253 analyzes SEI, grasps "initial_cpb_removal_time" and "cpb_removal_delay", for example, and checks whether a decoding timing from the CPU 201 is adequate or not.

When decoding a slice, the decoding unit 253 acquires from a slice header "ref_idx_10_active (ref_idx_11_active) as information representing a prediction destination of a time direction, and predicts a time direction. It should be noted that a decoded picture has an index of "short_term_ref_pic_set_idx" or "it_idx_sps" obtained from the slice header and is processed to be referenced by another picture.

Referring back to FIG. 15, the decoded picture buffer (dpb) 206 temporarily stores image data of each picture, which is decoded in the decoder 205. The post-processing unit 207 performs processing of matching a frame rate of the image data of each picture sequentially read at a display timing from the decoded picture buffer (dpb) 206 with a display capability. In this case, a display timing is given from the CPU 201 on the basis of the PTS (Presentation Time stamp).

For example, when the frame rate of the decoded image data of each picture is 120 fps and when the display capability is 120 fps, the post-processing unit 207 transmits the decoded image data of each picture to a display as it is. Further, for example, when the frame rate of the decoded image data of each picture is 120 fps and when the display capability is 60 fps, the post-processing unit 207 performs subsampling processing on the decoded image data of each picture such that the time-direction resolution becomes ½ times, and transmits the data to the display as image data of 60 fps.

Further, for example, when the frame rate of the decoded image data of each picture is 60 fps and the display capability is 120 fps, the post-processing unit 207 performs interpolation processing on the decoded image data of each picture such that the time-direction resolution becomes twice, and transmits the data to the display as image data of 120 fps. Further, for example, when the frame rate of the decoded image data of each picture is 60 fps and when the display capability is 60 fps, the post-processing unit 207 transmits the decoded image data of each picture to the display as it is.

Figure 23:
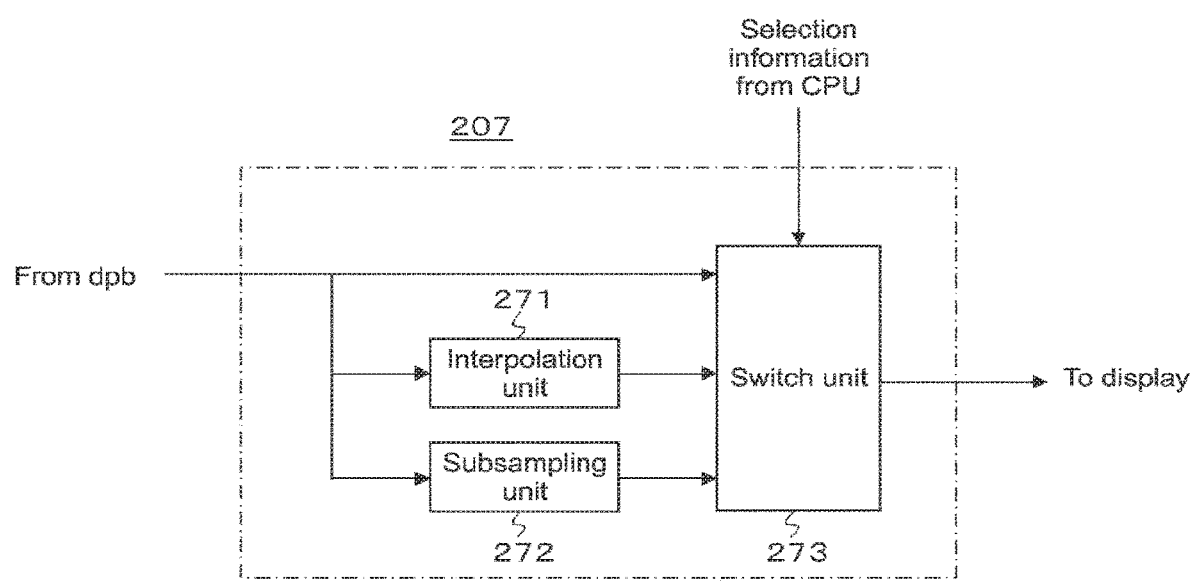
FIG. 23 is a diagram showing a configuration example of a post-processing unit.

FIG. 23 shows a configuration example of the post-processing unit 207. This is an example manageable in the case where the frame rate of the decoded image data of each picture is 120 fps or 60 fps and the display capability is 120 fps or 60 fps as described above.

The post-processing unit 207 includes an interpolation unit 271, a subsampling unit 272, and a switch unit 273. The decoded image data of each picture from the decoded picture buffer 206 is directly input to the switch unit 273, input to the switch unit 273 after the frame rate is made twice in the interpolation unit 271, or input to the switch unit 273 after the frame rate is made ½ times in the subsampling unit 272.

The switch unit 273 is provided with selection information from the CPU 201. The selection information is generated automatically by the CPU 201 referencing the display capability or generated according to a user operation. The switch unit 273 selectively outputs any of the inputs on the basis of the selection information. Thus, the frame rate of the image data of each picture sequentially read from the decoded picture buffer (dpb) 206 at a display timing is matched with the display capability.

Figure 24:
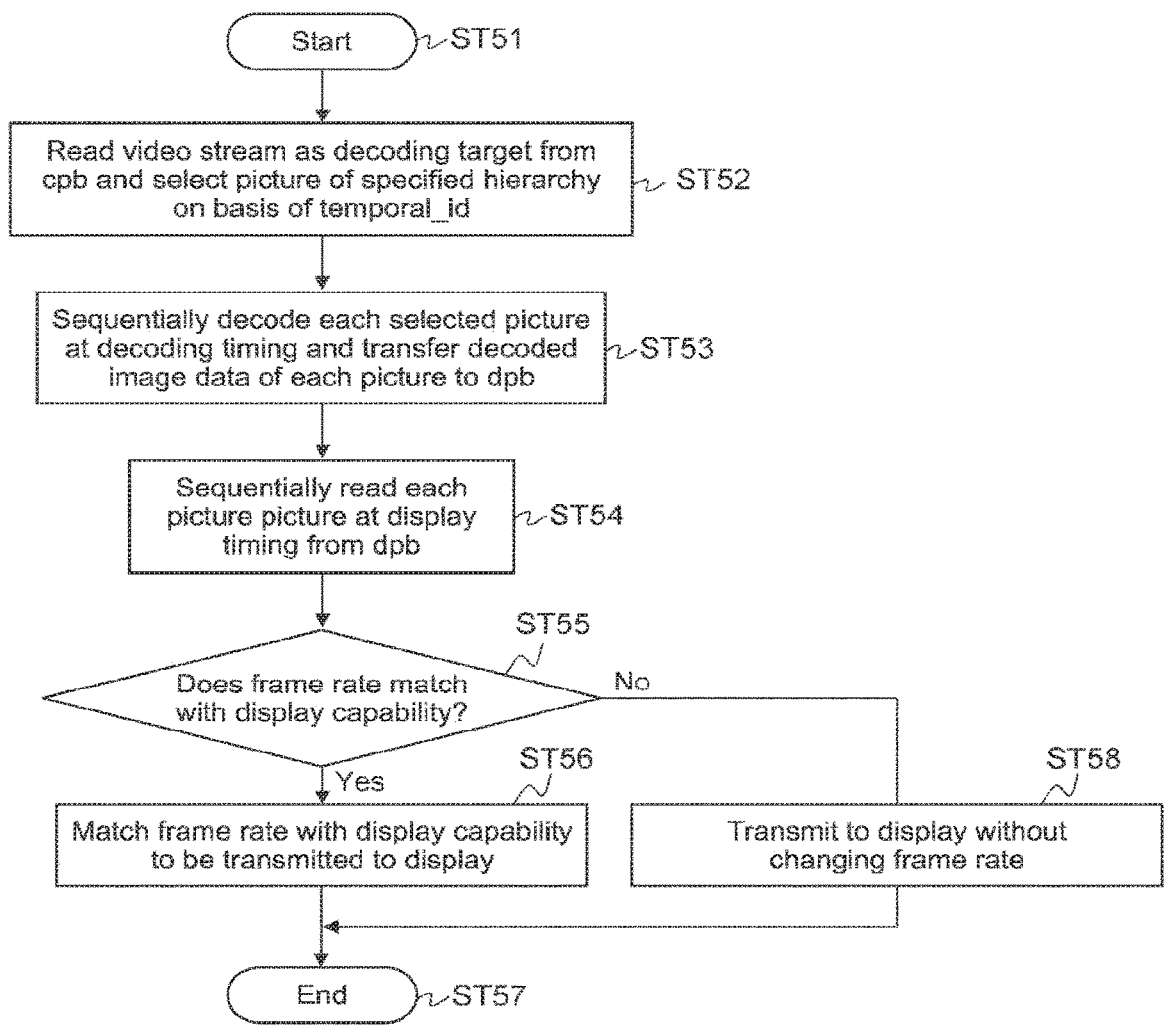
FIG. 24 is a diagram showing an example of a processing flow of the decoder and the post-processing unit.

FIG. 24 shows an example of a processing flow of the decoder 205 and the post-processing unit 207. The decoder 205 and the post-processing unit 207 start processing in Step ST51 and then move to processing of Step ST52. In Step ST52, the decoder 205 reads a video stream as a decoding target stored in the coded picture buffer (cpb) 204 and selects a picture or a hierarchy specified as a decoding target from the CPU 201 on the basis of temporal_id.

Next, the decoder 205 sequentially decodes encoded image data of each selected picture at a decoding timing, transfers the decoded image data of each picture to the decoded picture buffer (dpb) 206, and temporarily stores the decoded image data in Step ST53. Next, the post-processing unit 207 reads the image data of each picture from the decoded picture buffer (dpb) 206 at the display timing in Step ST54.

Next, the post-processing unit 207 determines whether the frame rate of the read image data of each picture matches with the display capability or not. When the frame rate does not match with the display capability, the post-processing unit 207 matches the frame rate with the display capability to be transmitted to the display in Step ST56, and then terminates the processing in Step ST57. On the other hand, when the frame rate matches the display capability, the post-processing unit 207 transmits the image data to the display without changing the frame rate in Step ST58 and then terminates the processing in Step ST57.

The operation of the reception apparatus 200 shown in FIG. 15 will be described briefly. In the reception unit 202, an RF-modulated signal received by a reception antenna is demodulated and a transport stream TS is acquired. The transport stream TS is transmitted to the demultiplexer 203. In the demultiplexer 203, encoded image data of a picture of a hierarchy group corresponding to a decoding capability (Decoder temporal layer capability) is selectively taken out from the transport stream TS, transmitted to the coded picture buffer (cpb) 204, and temporarily, stored.

In the decoder 205, encoded image data of a picture of a hierarchy specified as a hierarchy to be decoded is taken out from the video stream stored in the coded picture buffer 204. In the decoder 205, the taken-out encoded image data of each picture is then decoded at a decoding timing of that picture, transmitted to the decoded picture buffer (dpb) 206, and temporarily stored. In this case, when the encoded image data of each picture is decoded, image data of a referenced picture is read from the decoded picture buffer 206 for use as necessary.

The image data of each picture sequentially read from the decoded picture buffer (dpb) 206 at a display timing is transmitted to the post-processing unit 207. In the post-processing unit 207, interpolation or subsampling for matching the frame rate of the image data of each picture with the display capability is performed. The image data of each picture processed in the post-processing unit 207 is supplied to the display, and displaying of a moving image by the image data of that picture is performed.

As described above, in the transmission and reception system 10 shown in FIG. 1, on the transmission side, the identification information for identifying a hierarchy group to which encoded image data of each picture included in a video stream belongs is inserted into a layer (header of a PES packet) of this video stream. Therefore, for example, on the reception side, using this identification information easily enables selective decoding of encoded image data of a picture of a hierarchy equal to or lower than a predetermined hierarchy corresponding to the decoding capability.

Further, in the transmission and reception system 10 shown in FIG. 1, on the transmission side, the scalability extension descriptor (scalability_extension_descriptor) and the like are inserted into the layer of the transport stream TS. Therefore, for example, on the reception side, it is possible to easily grasp the hierarchy information in hierarchical encoding, the configuration information of the video stream included in the transport stream TS, and the like and perform appropriate decoding processing.

Further, in the transmission and reception system 10 shown in FIG. 1, on the reception side, encoded image data of a picture of a hierarchy equal to or lower than a predetermined hierarchy corresponding to the decoding capability (Decoder temporal layer capability) is selectively taken in the coded picture buffer 204 from the received video stream and then decoded. Therefore, for example, it is possible to perform appropriate decoding processing corresponding to the decoding capability.

Further, in the transmission and reception system 10 shown in FIG. 1, on the reception side, the function of selectively rewriting a decoding time stamp of the encoded image data of each picture taken in the coded picture buffer 204 and adjusting decoding intervals of low hierarchy pictures is provided. Therefore, for example, this enables realistic decoding processing even when the decoder 205 has a low decoding capability.

Further, in the transmission and reception system 10 shown in FIG. 1, on the reception side, the frame rate of decoded image data of each picture is matched with the display capability in the post-processing unit 207. Therefore, for example, the image data of the frame rate matched with a high display capability can be obtained even when the decoding capability is low.

2. Modified Example

It should be noted that the embodiment described above has shown the example in which the identification information for identifying a hierarchy group to which encoded image data of each picture included in a video stream belongs among a predetermined number of hierarchy groups is inserted into the header or a PES packet (PES header). However, the position at which this identification information is inserted is not limited thereto.

For example, the multiplexer 104 (see FIG. 2) may insert this identification information into the adaptation field or a TS packet having an adaptation field. For example, when the multiple hierarchies are divided into two of a low hierarchy group and a high hierarchy group, the multiplexer 104 uses a 1-bit field of a known elementary stream priority indicator (elementary_stream_priority_indicator), located in the adaptation field.

When a PES packet including in a payload encoded image data of a picture of a hierarchy group on the low hierarchy side is included in a payload of a subsequent TS packet, the 1-bit field is set to "1", that is, set to have a high degree of priority. On the other hand, when a PES packet including in a payload encoded image data of a picture of a hierarchy group on the low hierarchy side is included in a payload of a subsequent TS packet, the 1-bit field is set to "0", that is, set to have a low degree of priority.

Figure 25:
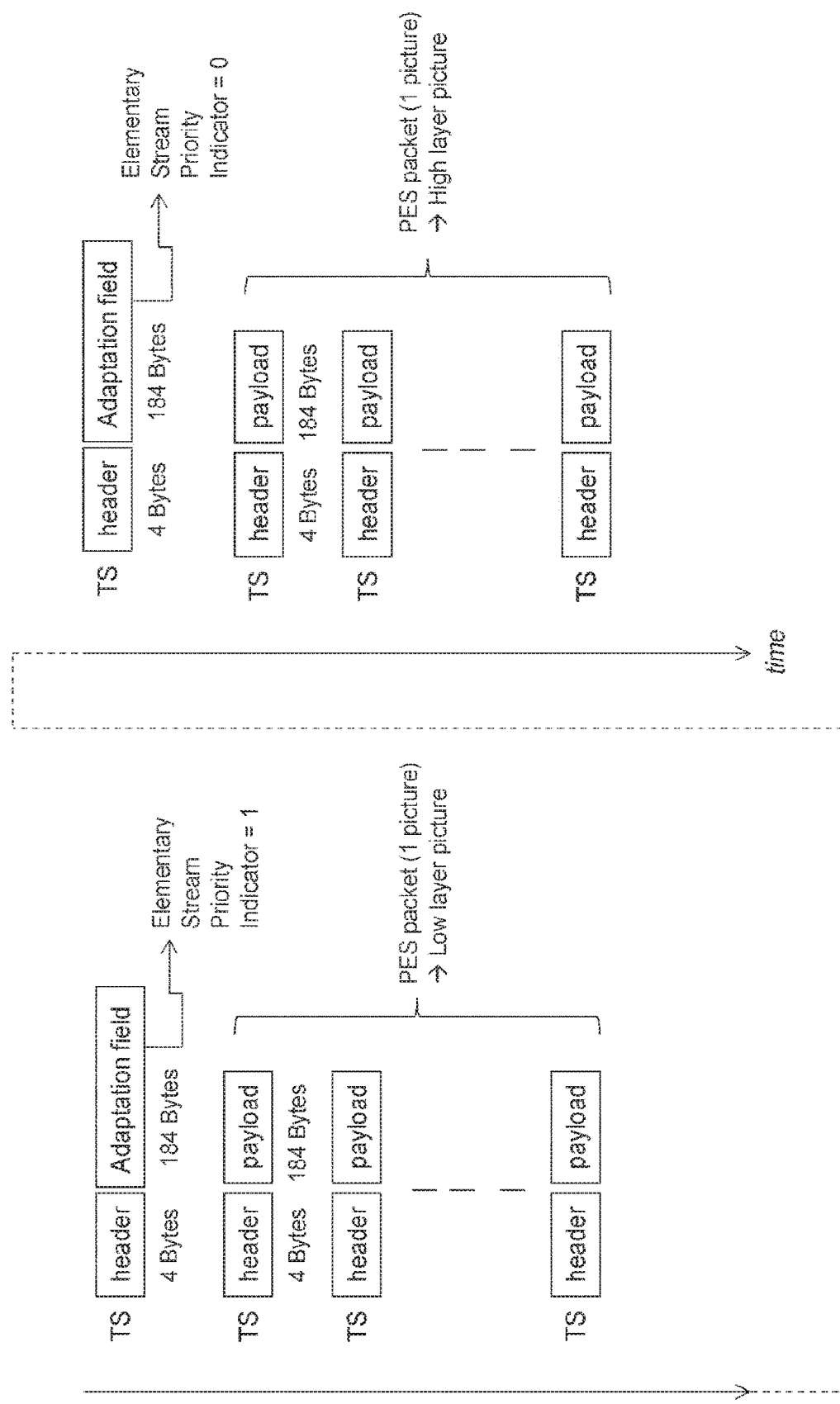
FIG. 25 is a diagram showing an arrangement example of an adaptation field.

FIG. 25 shows an arrangement example of an adaptation field. This is an example in which the multiple hierarchies are divided into two of a low hierarchy group and a high hierarchy group, and a 1-bit field of an elementary stream priority indicator (elementary_stream_priority_indicator) is used.

In the example shown in the figure, a TS packet including an adaptation field is arranged immediately before each group including a predetermined number of TS packets, the TS packets separately including a PES packet including encoded image data of one picture in a payload. In this case, when the one picture is a picture of a hierarchy group on the low hierarchy side, the 1-bit field of the elementary stream priority indicator is set to "1". On the other hand, when the one picture is a picture of a hierarchy group on the high hierarchy side, the 1-bit field of the elementary stream priority indicator is set to "0".

As shown in FIG. 25, arranging the TS packet including the adaptation field enables the reception side to easily identify a hierarchy group to which encoded data of a picture belongs, for each encoded image data or a picture included in a video stream. It should be noted that the arrangement example of FIG. 25 shows that a TS packet including an adaptation field is arranged on a picture-by-picture basis. However, each time a hierarchy group to which a picture belongs is changed, a TS packet including an adaptation field may be arranged immediately therebefore.

Figure 26:
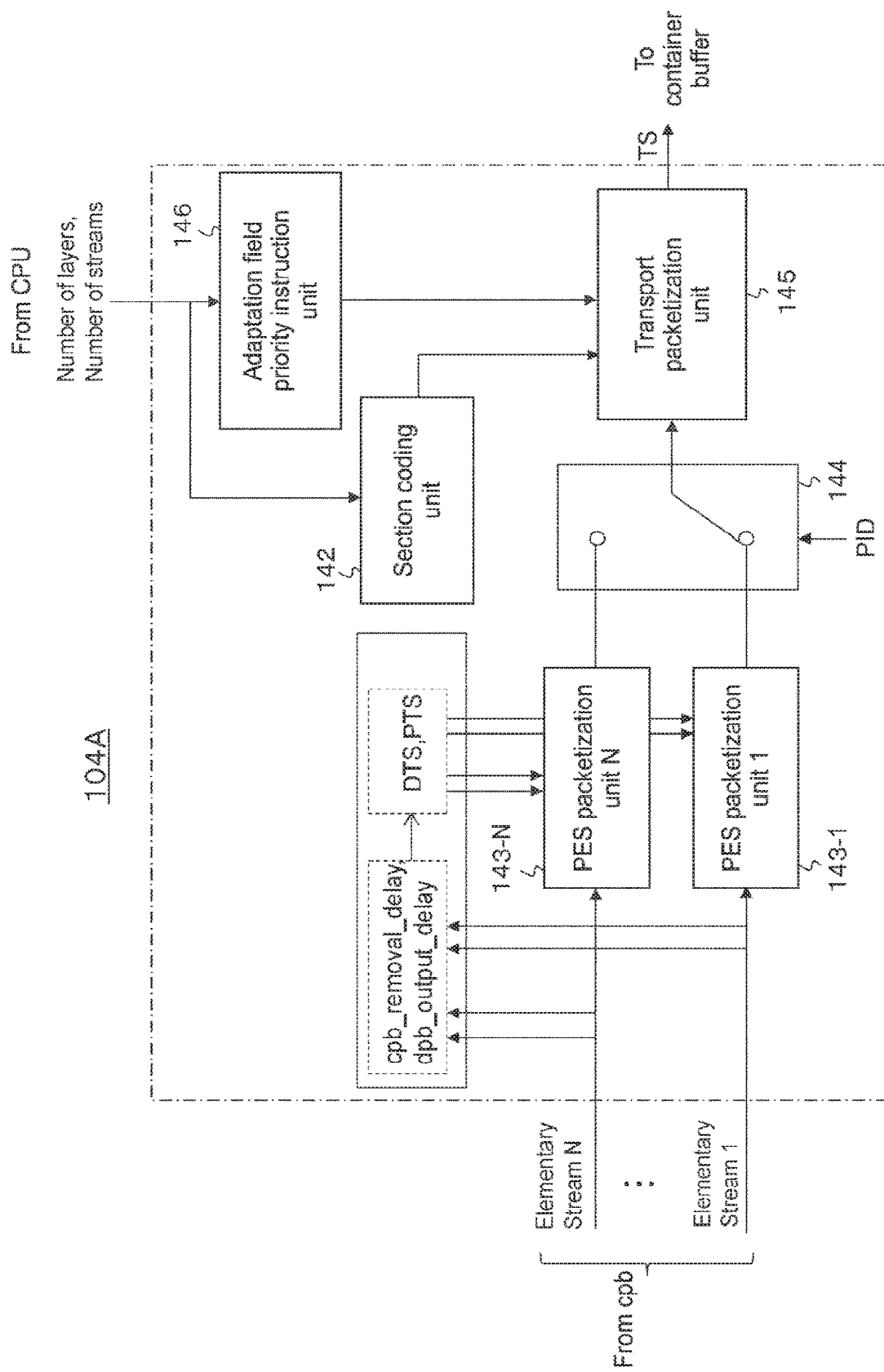
FIG. 26 is a block diagram showing a configuration example of a multiplexer when identification information of a hierarchy group is inserted into an adaptation field.

FIG. 26 shows a configuration example of a multiplexer 104A of the transmission apparatus 100 when identification information of a hierarchy group is inserted into an adaptation field as described above. In FIG. 26, portions corresponding to those in FIG. 12 are denoted by the same reference symbols and detailed description thereof will be omitted. The multiplexer 104A includes an adaptation field priority instruction unit 146 instead of the PES priority generation unit 141 of the multiplexer 104 of FIG. 12.

The priority instruction unit 146 is provided with information on the number of hierarchies (Number of layers) and the number of streams (Number of streams) from the CPU 101. The priority instruction unit 146 generates degree-of-priority information of each hierarchy group when the multiple hierarchies represented by the number of hierarchies are divided into a predetermined number of, i.e., two or more hierarchy groups. For example, when the multiple hierarchies are divided into two, the priority instruction unit 146 generates a value to be inserted into the 1-bit field of the elementary stream priority indicator ("1" for the low hierarchy group, "0" for the high hierarchy group).

The degree-of-priority information of each hierarchy group, which is generated in the priority instruction unit 146, is supplied to the transport packetization unit 145. The transport packetization unit 145 arranges a TS packet including an adaptation field immediately before each group including a predetermined number of TS packets, the TS packets separately including a PES packet including encoded image data of one picture in a payload. In such a case, the transport packetization unit 145 then inserts, as identification information, the degree-of-priority information corresponding to a hierarchy group to which the picture belongs into the adaptation field.

Figure 27:
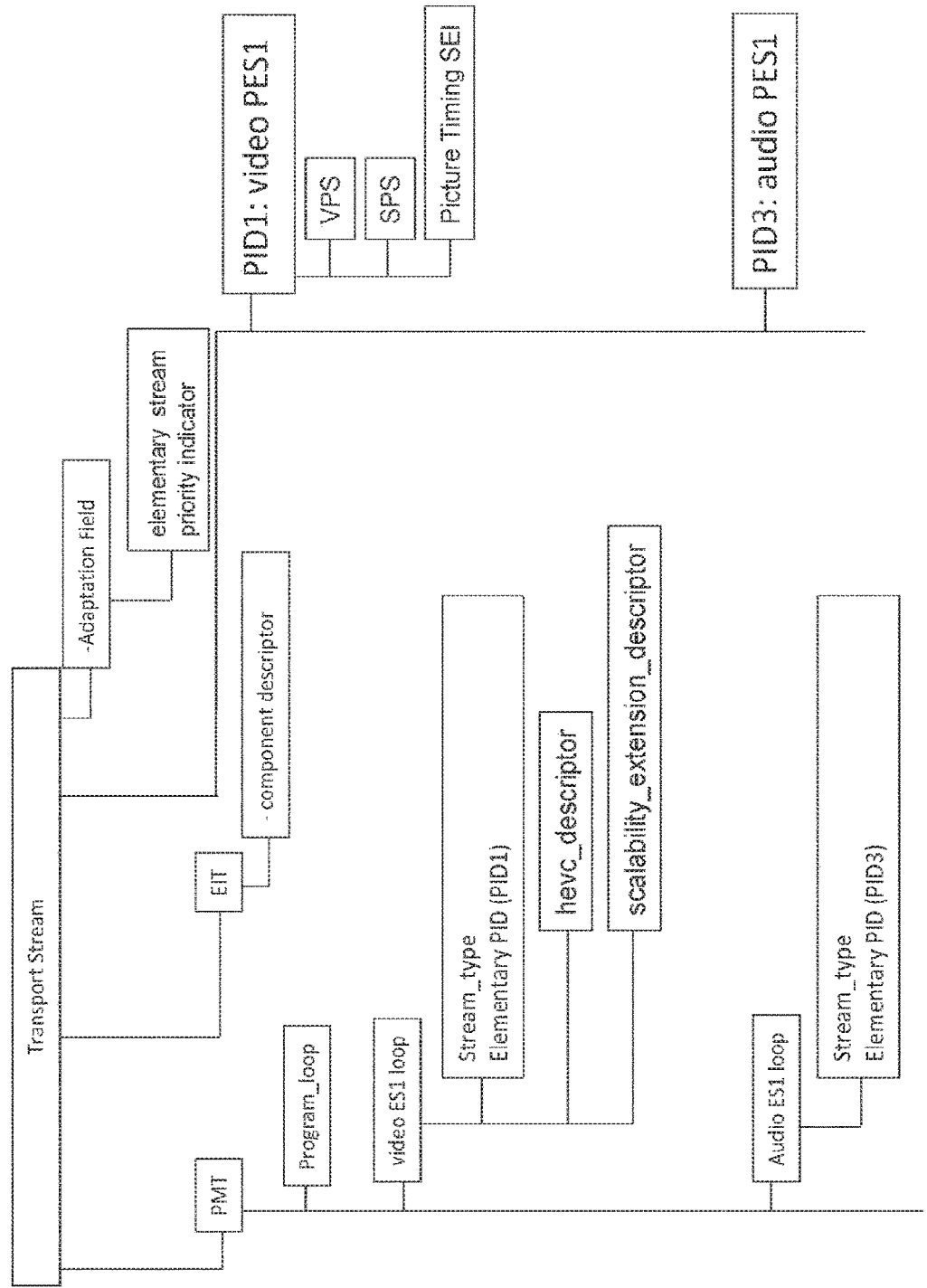
FIG. 27 is a diagram showing a configuration example of a transport stream TS when identification information of a hierarchy group is inserted into an adaptation field.

FIG. 27 shows a configuration example of a transport stream TS when identification information of a hierarchy group is inserted into an adaptation field as described above. This configuration example is substantially the same as the configuration example described above shown in FIG. 14. In this configuration example, a TS packet including an adaptation field exists, and identification information for identifying a hierarchy groups to which each picture belongs is inserted into the adaptation field. For example, when the multiple hierarchies are divided into two of a low hierarchy group and a high hierarchy group, the 1-bit field of the elementary stream priority indicator (elementary_stream_priority_indicator) is used.

Figure 28:
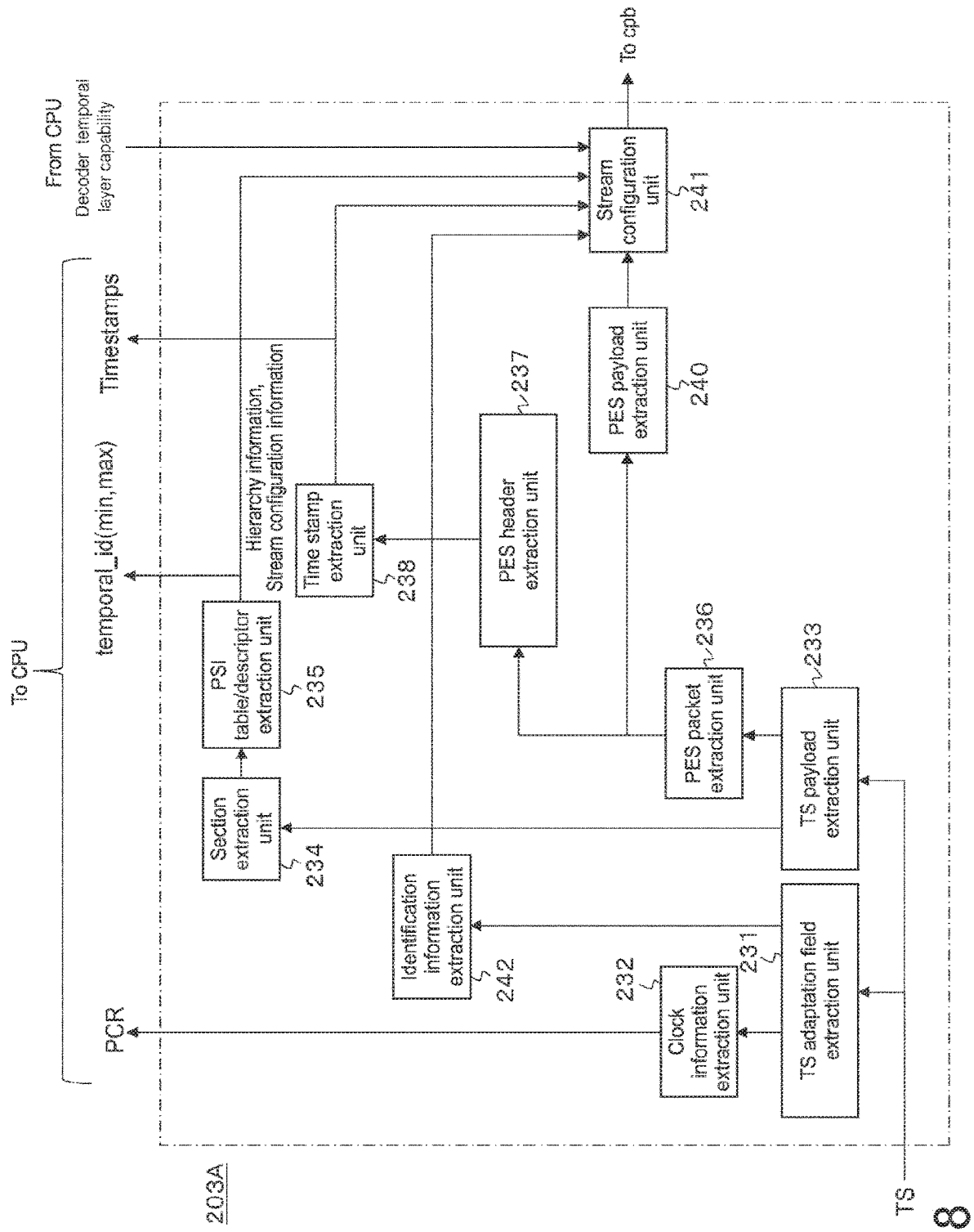
FIG. 28 is a block diagram showing a configuration example of a demultiplexer when identification information of a hierarchy group is inserted into an adaptation field.

FIG. 28 shows a configuration example of a demultiplexer 203A of the reception apparatus 200 when identification information of a hierarchy group is inserted into an adaptation field as described above. In FIG. 28, portions corresponding to those in FIG. 16 are denoted by the same reference symbols and detailed description thereof will be omitted. The demultiplexer 203A includes an identification information extraction unit 242 instead of the identification information extraction unit 239 of the demultiplexer 203 of FIG. 16.

The identification information extraction unit 242 extracts identification information from an adaptation field and transmits the identification information to the stream configuration unit 241. For example, when the multiple hierarchies are divided into two of a low hierarchy group and a high hierarchy group, the identification information extraction unit 242 extracts degree-of-priority information of the 1-bit field of "elementary_stream_priority_indicator" of the adaptation field, and transmits the degree-of-priority information to the stream configuration unit 241.

The stream configuration unit 241 selectively takes out encoded image data of a picture of a hierarchy group corresponding to a decoding capability (Decoder temporal layer capability) from the encoded image data of pictures of each hierarchy taken out in the PES payload extraction unit 240, and transmits the encoded image data to the coded picture buffer (cpb) 204. In this case, the stream configuration unit 241 references the hierarchy information and stream configuration information obtained in the PSI table/descriptor extraction unit 235, the identification information (degree-of-priority information) extracted in the identification information extraction unit 242, and the like.

Further, in the embodiment described above, the transmission and reception system 10 constituted by the transmission apparatus 100 and the reception apparatus 200 has been described, but the configuration of the transmission and reception system to which the present technology is applicable is not limited thereto. For example, the following configuration may be provided: the portion of the reception apparatus 200 may be a set-top box and a monitor connected by a digital interface such as (HDMI (High-Definition Multimedia Interface). It should be noted that "HDMI" is a registered trademark.

Further, in the embodiment described above, the example in which the container is a transport stream (MPEG-2 TS) has been described. However, the present technology is similarly applicable to a system having a configuration using a network such as the Internet for distribution to a reception terminal. In the distribution over the Internet, the distribution is performed in an MP4 or a container of any other format in many cases. Specifically, containers of various formats such as a transport stream (MPEG-2 TS) adopted in the standard of digital broadcasting and an MP4 used in the distribution over the Internet are applied as a container.

Figure 29:
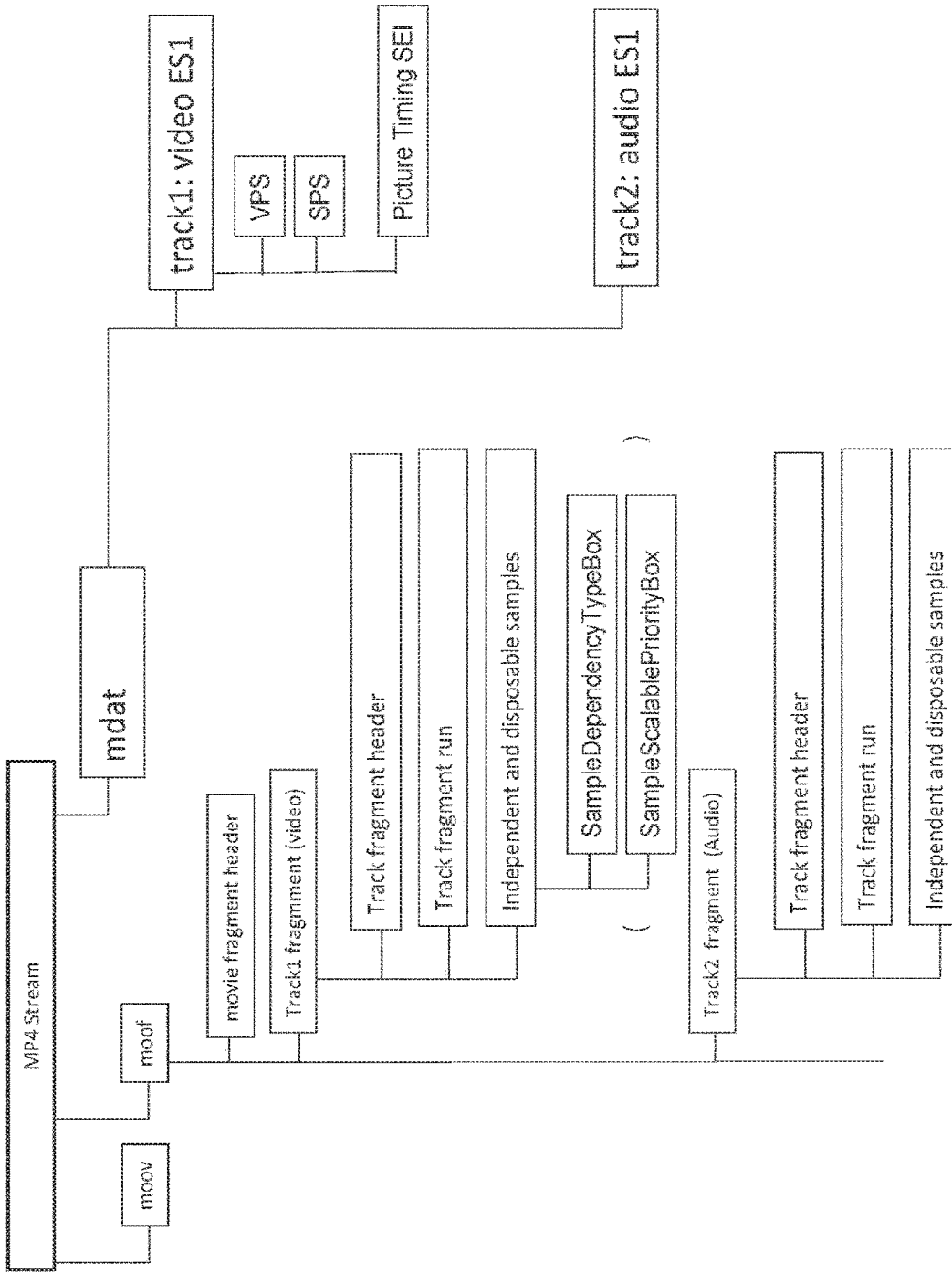
FIG. 29 is a diagram showing a configuration example of an MP4 stream.

For example, FIG. 29 shows a configuration example of an MP4 stream. In the MP4 stream, boxes of "moov", "moof", "mdat", and the like exist. In the box of "mdat", as tracks, a video elementary stream "track1:video ES1" as an encoded stream of a video exists, and an audio elementary stream "track1:audio ES1" as an encoded stream of audio exists.

Further, in the box of "moof", "mfhd (movie fragment header" exists as a header portion, and "track fragment" corresponding to each track exists as a data portion thereof. In "track1 fragment(video)" corresponding to the video elementary stream "track1:video ES1", "Independent and disposal samples" exists. In "Independent and disposal samples", a box of "SampleDependencyTypeBox" corresponding to each picture is inserted.

In this box, identification information for identifying a hierarchy group to which encoded image data of each picture belongs can be inserted. For example, when the multiple hierarchies are divided into two hierarchy groups of the uppermost hierarchy and the other lower hierarchy, the identification information can be inserted using 2-bit field of "sample_depends_on" and a 2-bit field of "sample_is_depended_on".

FIG. 30 shows a structural example (Syntax) of "SampleDependencyTypeBox". Further, FIG. 31 shows details (Semantics) of main information in the structural example. In this case, "1" is set for "sample_depends_on" so as to indicate that it is used to reference another picture and is not an I picture, and "2" is set for "sample_is_depended_on" so as to indicate that it is not referenced by another picture. Thus, it is possible to identify a picture belonging to a group or the uppermost hierarchy. Further, in other situations, it is possible to identify that picture as a picture belonging to a hierarchy group of a hierarchy.

It should be noted that use of a box "SampleScalablePriorityBox" newly defined can also be conceived instead of using a box of "SampleDependencyTypeBox". FIG. 32 shows a structural example (Syntax) of "SampleScalablePriorityBox". Further, FIG. 33 shows details (Semantics) of main information in the structural example.

In this case, when the multiple hierarchies are divided into two hierarchy groups of the lowermost hierarchy group and the high hierarchy group, the identification information is inserted using a 2-bit field of "base_and_priority". In other words, for example, when "1" is set for "base_and_priority", it is possible to identify a picture having a low degree of priority and belonging to the high hierarchy group. On the other hand, for example, when "2" is set for "base_and_priority", it is possible to identify a picture having a high degree of priority and belonging to the low hierarchy group.

Further, the present technology can have the following configurations.

(1) A transmission apparatus, including:
  an image encoding unit that sorts image data of pictures constituting moving image data into multiple hierarchies, encodes image data of pictures of each of the sorted hierarchies, and generates video data including the encoded image data of the pictures of each of the hierarchies;
  a transmission unit that transmits a container of a predetermined format including the generated video data; and
  an identification information insertion unit that divides the multiple hierarchies into a predetermined number of hierarchy groups, the predetermined number being two or more, and inserts identification information for identifying a hierarchy group to which encoded image data of each picture included in the video data belongs, into a packet as a container of the video data.

(2) The transmission apparatus according to (1), in which the identification information is degree-of-priority information that is set to be higher for a hierarchy group on a low hierarchy side.

(3) The transmission apparatus according to (1), in which the identification information is inserted into a header of a PES packet including the encoded image data for each picture in a payload.

(4) The transmission apparatus according to (3), in which the identification information is inserted using a field of a PES priority of the header.

(5) The transmission apparatus according to (1), in which the identification information is inserted into an adaptation field of a TS packet including the adaptation field.

(6) The transmission apparatus according to (5), in which the identification information is inserted using a field of an ES priority indicator of the adaptation field.

(7) The transmission apparatus according to (1), in which the identification information is inserted into a box of a header related to a track of an appropriate picture.

(8) The transmission apparatus according to any one of (1) to (7), in which
  the image encoding unit
    generates a single video stream including the encoded image data of the pictures of each of the hierarchies or a predetermined number of video data items each including the encoded image data of the pictures of each of the hierarchies, and
    further includes a configuration information insertion unit that inserts configuration information of the video stream included in the container into a layer of the container.

(9) A transmission method, including:
  an image encoding step of sorting image data of pictures constituting moving image data into multiple hierarchies, encoding image data of pictures of each of the sorted hierarchies, and generating video data including the encoded image data of the pictures of each of the hierarchies;
  a transmission step of transmitting, by a transmission unit, a container of a predetermined format including the generated video data; and
  an identification information insertion step of dividing the multiple hierarchies into a predetermined number of hierarchy groups, the predetermined number being two or more, and inserting identification information for identifying a hierarchy group to which encoded image data of each picture included in the video data belongs, into a packet as a container of the video data.

(10) A reception apparatus, including:
  an reception unit that receives a container of a predetermined format including video data including encoded image data of pictures of each of hierarchies, the encoded image data being obtained by sorting image data of pictures constituting moving image data into multiple hierarchies and encoding the image data; and
  an image decoding unit that selectively takes in a buffer encoded image data of a picture of a hierarchy equal to or lower than a predetermined hierarchy corresponding to a decoding capability from the video data included in the received container, decodes the encoded image data of each picture taken in the buffer, and obtains image data of the picture of the hierarchy equal to or lower than the predetermined hierarchy.

(11) The reception apparatus according to (10), in which
  the multiple hierarchies are divided into a predetermined number of hierarchy groups, the predetermined number being two or more, and identification information for identifying a hierarchy group to which the encoded image data of each picture included in the video data belongs is inserted into a packet as a container of the video data, and
  the image decoding unit takes in the buffer tree encoded image data of the picture of a predetermined hierarchy group corresponding to the decoding capability and decodes the encoded image data on the basis of the identification information.

(12) The reception apparatus according to (11), in which the identification information is inserted into a header of a PES packet including the encoded image data for each picture in a payload.

(13) The reception apparatus according to (11), in which the identification information is inserted into an adaptation field of a TS packet including the adaptation field.

(14) The transmission apparatus according to (11), in which the identification information is inserted into a box of a header related to a track of an appropriate picture.

(15) The reception apparatus according to (10), in which
  the multiple hierarchies are divided into a predetermined number of hierarchy groups, the predetermined number being two or more, and the received container includes the predetermined number of video streams respectively including encoded image data of pictures of the predetermined number of hierarchy groups, and
  the image decoding unit takes in the buffer the encoded image data of the picture of the predetermined hierarchy group corresponding to the decoding capability and decodes the encoded image data on the basis of stream identification information.

(16) The reception apparatus according to (15), in which the image decoding unit converts, when the encoded image data of the picture of the predetermined hierarchy group is included in multiple video streams, the encoded image data of each picture into one scream on the basis of decoding timing information and takes the stream in the buffer.

(17) The reception apparatus according to any one of (10) to (16), in which
the image decoding unit has a function of rewriting a decoding time stamp of the encoded image data of each picture selectively taken in the buffer and adjusting decoding intervals of low hierarchy pictures.

(18) The reception apparatus according to any one of (10) to (17), further including a post-processing unit that matches a frame rate of the image data of each picture obtained in the image decoding unit with the display capability.

(19) A reception method, including:
reception step of receiving, by a reception unit, a container of a predetermined format including video data including encoded image data of pictures of each of hierarchies, the encoded image data being obtained by sorting image data of pictures constituting moving image data into multiple hierarchies and encoding the image data; and
an image decoding step of selectively taking in a buffer encoded image data of a picture of a hierarchy equal to or lower than a predetermined hierarchy corresponding to a decoding capability from the video data included in the received container, decoding the encoded image data of each picture taken in the buffer, and obtaining image data of the picture of the hierarchy equal to or lower than the predetermined hierarchy.

A main feature of the present technology is to insert identification information for identifying a hierarchy group to which encoded image data of each picture included in a video data belongs into a packet as a container of video data, and thus easily enable the reception side to selectively decode encoded image data of a picture of a hierarchy equal to or lower than a predetermined hierarchy corresponding to a decoding capability by using the identification information (see FIG. 12).

DESCRIPTION OF SYMBOLS 10 transmission and reception system
100 transmission apparatus
101 CPU
102 encoder
103 coded picture buffer (cpb)
104,104A multiplexer
105 transmission unit
141 PES priority generation unit
142 section coding unit
143-1 to 143-N PES packetization unit
144 switch unit
145 transport packetization unit
146 adaptation field priority instruction unit
200 reception apparatus
201 CPU
202 reception unit
203 demultiplexer
204 coded picture buffer (cpb)
205 decoder
206 decoded picture buffer (dpb)
207 post-processing unit
231 TS adaptation field extraction unit
232 clock information extraction unit
233 TS payload extraction unit
234 section extraction unit
235 PSI table/descriptor extraction unit
236 PES packet extraction unit
237 PES header extraction unit
238 time stamp extraction unit
239 identification information extraction unit
240 PES payload extraction unit
241 stream configuration unit
242 identification information extraction unit
251 temporal ID analysis unit
252 target hierarchy selection unit
253 decoding unit
271 interpolation unit
272 subsampling unit
273 switch unit

The invention claimed is:

1. A reception apparatus, comprising:
circuitry configured to
receive a description and encoded image data on a low layer side and a high layer side, wherein
the description includes first identification information of the low layer side of the encoded image data, and second identification information separate from the first identification information, the second identification information indicating a single level specification value of a bit stream including both the low layer side and the high layer side of the encoded image data, and
the encoded image data on the low layer side and the high layer side includes information for identifying a layer to which the encoded image data belongs,
in response to receiving the high layer as a specified layer, decode the encoded image data of the low layer side and decode the encoded image data of the high layer side on the basis of the description, and
set a frame rate of the decoded image data on the basis of selection information which is generated automatically or according to a user operation,
wherein information for identifying a layer to which each picture of the encoded image data belongs is included in a network abstraction layer (NAL) unit of the respective picture of the encoded image data.

2. The reception apparatus according to claim 1, wherein the first identification information is a level specification value of a bit stream including the low layer side of the encoded image data.

3. The reception apparatus according to claim 1, the circuitry further configured to extract the first identification information and the second identification information from the description.

4. The reception apparatus according to claim 1, wherein decoding intervals of pictures on the low layer side of the encoded image data are equal.

5. The reception apparatus according to claim 1, wherein the frame rate of the decoded image data is matched with a display capability.

6. The reception apparatus according to claim 1, wherein the description and the encoded image data are received through broadcast transmission.

7. The reception apparatus according to claim 1, wherein the encoded image data on the low layer side comprises encoded image data on a first layer and the encoded image data on the high layer side comprises encoded image data on a second layer,
the description includes the first identification information of the first layer and the second identification information of the first layer and the second layer, the circuitry is configured to decode the encoded image data on the first layer when the specified layer is the first layer, and the circuitry is configured to decode the encoded image data on the first layer and the encoded image data on the second layer when the specified layer is the second layer.

8. A reception method, comprising:

receiving a description and encoded image data on a low layer side and a high layer side, wherein the description includes first identification information of the low layer side of the encoded image data, and second identification information separate from the first identification information, the second identification information indicating a single level specification value of a bit stream including both the low layer side and the high layer side of the encoded image data, and the encoded image data on the low layer side and the high layer side includes information for identifying a layer to which the encoded image data belongs, in response to receiving the high layer as a specified layer, decoding the encoded image data of the low layer side and decoding the encoded image data of the high layer side on the basis of the description, and setting a frame rate of the decoded image data on the basis of selection information which is generated automatically or according to a user operation, wherein information for identifying a layer to which each picture of the encoded image data belongs is included in a network abstraction layer (NAL) unit of the respective picture of the encoded image data.

9. The reception method according to claim 8, wherein the first identification information is a level specification value of a bit stream including the low layer side of the encoded image data.

10. The reception method according to claim 8, fluffier comprising extracting the first identification information and the second identification information from the description.

11. The reception method according to claim 8, wherein decoding intervals of pictures on the low layer side of the encoded image data are equal.

12. The reception method according to claim 8, wherein the frame rate of the decoded image data is matched with a display capability.

13. The reception method according to claim 8, wherein the description and the encoded image data are received through broadcast transmission.

14. The reception method according to claim 8, wherein the encoded image data on the low layer side comprises encoded image data on a first layer and the encoded image data on the high layer side comprises encoded image data on a second layer, the description includes the first identification information of the first layer and the second identification information of the first layer and the second layer, the method comprising decoding the encoded image data on the first layer when the specified layer is the first layer, and the method comprising decoding the encoded image data on the first layer and the encoded image data on the second layer when the specified layer is the second layer.

15. A non-transitory computer-readable storage medium storing computer-readable instructions thereon, which, when executed by a reception apparatus, cause the reception apparatus to perform a method, comprising:

receiving a description and encoded image data on a low layer side and a high layer side, wherein the description includes first identification information of the low layer side of the encoded image data, and second identification information separate from the first identification information, the second identification information indicating a single level specification value of a bit stream including both the low layer side and the high layer side of the encoded image data, and the encoded image data on the low layer side and the high layer side includes information for identifying a layer to which the encoded image data belongs, in response to receiving the high layer as a specified layer, decoding the encoded image data of the low layer side and decoding the encoded image data of the high layer side on the basis of the description, and setting a frame rate of the decoded image data on the basis of selection information which is generated automatically or according to a user operation, wherein information for identifying a layer to which each picture of the encoded image data belongs is included in a network abstraction layer (NAL) unit of the respective picture of the encoded image data.

16. The reception apparatus according to claim 1, wherein, in response to the specified layer corresponding to the high layer side, the decoded image data includes pictures having information identifying the low layer side and pictures having information identifying the high layer side.

17. The reception method according to claim 8, wherein in response to the specified layer corresponding to the high layer side, the decoded image data includes pictures having information identifying the low layer side and pictures having information identifying the high layer side.

18. The non-transitory computer-readable storage medium according to claim 15, wherein in response to the specified layer corresponding to the high layer side, the decoded image data includes pictures having information identifying the low layer side and pictures having information identifying the high layer side.

* * * * *